United States Patent
Huang et al.

(10) Patent No.: US 9,444,887 B2
(45) Date of Patent: Sep. 13, 2016

(54) MULTIPATH OVERLAY NETWORK AND ITS MULTIPATH MANAGEMENT PROTOCOL

(75) Inventors: Xiaolong Huang, San Diego, CA (US); Vijayalakshmi R. Raveendran, San Diego, CA (US); Xun Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 677 days.

(21) Appl. No.: 13/116,980

(22) Filed: May 26, 2011

(65) Prior Publication Data

US 2012/0303822 A1 Nov. 29, 2012

(51) Int. Cl.
*H04L 29/08* (2006.01)
*H04L 12/715* (2013.01)
*H04L 29/06* (2006.01)

(52) U.S. Cl.
CPC .......... *H04L 67/104* (2013.01); *H04L 45/64* (2013.01); *H04L 65/4069* (2013.01); *H04L 65/80* (2013.01)

(58) Field of Classification Search
CPC ........................................... H04L 45/64
USPC ........................................... 709/227
See application file for complete search history.

(56) References Cited

U.S. PATENT DOCUMENTS

| | | | |
|---|---|---|---|
| 6,580,909 B1* | 6/2003 | Carro | 455/435.1 |
| 6,834,044 B2 | 12/2004 | Sugirtharaj et al. | |
| 6,954,435 B2* | 10/2005 | Billhartz | H04L 12/5695 370/252 |
| 7,388,841 B2* | 6/2008 | Shao | H04L 45/00 370/238 |
| 7,502,328 B2 | 3/2009 | Lee et al. | |
| 7,643,427 B2 | 1/2010 | Kokku et al. | |
| 7,733,769 B1 | 6/2010 | Jennings et al. | |
| 7,839,850 B2 | 11/2010 | Kompella | |
| 7,961,710 B2 | 6/2011 | Lee et al. | |
| 2002/0073232 A1 | 6/2002 | Hong et al. | |
| 2003/0007515 A1 | 1/2003 | Apostolopoulos et al. | |
| 2004/0148391 A1 | 7/2004 | Shannon, Sr. et al. | |
| 2006/0039371 A1 | 2/2006 | Castro et al. | |
| 2006/0041698 A1 | 2/2006 | Han et al. | |
| 2006/0077942 A1* | 4/2006 | Panwar et al. | 370/338 |
| 2007/0064684 A1 | 3/2007 | Kottilingal | |
| 2007/0066315 A1 | 3/2007 | Kado | |
| 2007/0110035 A1 | 5/2007 | Bennett | |
| 2008/0137653 A1 | 6/2008 | Jonsson | |

(Continued)

FOREIGN PATENT DOCUMENTS

| | | |
|---|---|---|
| CN | 1650573 A | 8/2005 |
| CN | 101287268 A | 10/2008 |

(Continued)

OTHER PUBLICATIONS

Apostolopoulos, J.G., et al., "Path diversity for enhanced media streaming," IEEE Communications Magazine, vol. 42, No. 8, pp. 80-87, Aug. 2004.

(Continued)

*Primary Examiner* — Asghar Bilgrami
(74) *Attorney, Agent, or Firm* — François A. Pelaez

(57) ABSTRACT

A method of wireless communication includes aggregating data in a streaming communication session from a source node in a destination aggregator node, wherein data in the streaming session is transported over multiple paths from the source node to the aggregator node via a multipath overlay network discovered by the source node and the aggregator node.

32 Claims, 23 Drawing Sheets

(56) References Cited

U.S. PATENT DOCUMENTS

| | | | |
|---|---|---|---|
| 2008/0205394 A1 | 8/2008 | Deshpande et al. | |
| 2009/0073921 A1* | 3/2009 | Ji et al. | 370/328 |
| 2009/0161592 A1* | 6/2009 | So | 370/312 |
| 2009/0185492 A1 | 7/2009 | Senarath et al. | |
| 2009/0227258 A1 | 9/2009 | Youn et al. | |
| 2009/0290555 A1 | 11/2009 | Alpert et al. | |
| 2010/0027418 A1 | 2/2010 | Rodrig | |
| 2010/0054155 A1 | 3/2010 | Cai et al. | |
| 2010/0061244 A1 | 3/2010 | Meier et al. | |
| 2010/0064049 A1 | 3/2010 | Magharei et al. | |
| 2010/0085979 A1* | 4/2010 | Liu et al. | 370/408 |
| 2010/0088390 A1 | 4/2010 | Bai et al. | |
| 2010/0121971 A1 | 5/2010 | Shao et al. | |
| 2010/0260190 A1 | 10/2010 | Hiie et al. | |
| 2010/0315958 A1 | 12/2010 | Luo et al. | |
| 2011/0047238 A1* | 2/2011 | Balasaygun | G06F 9/543 709/208 |
| 2011/0051651 A1 | 3/2011 | Wu et al. | |
| 2011/0125921 A1 | 5/2011 | Karenos et al. | |
| 2012/0311072 A1 | 12/2012 | Huang et al. | |
| 2013/0064105 A1 | 3/2013 | Huang et al. | |
| 2013/0136116 A1 | 5/2013 | Viswanathan et al. | |

FOREIGN PATENT DOCUMENTS

| | | |
|---|---|---|
| CN | 102067514 A | 5/2011 |
| GB | 2469469 A | 10/2010 |
| JP | 2000509565 A | 7/2000 |
| JP | 2004538690 A | 12/2004 |
| JP | 2008301002 A | 12/2008 |
| JP | 2010511348 A | 4/2010 |
| JP | 2010109825 A | 5/2010 |
| JP | 2011514031 A | 4/2011 |
| WO | 0079730 A2 | 12/2000 |
| WO | 0223934 A1 | 3/2002 |
| WO | 02065803 A1 | 8/2002 |
| WO | 03005677 A1 | 1/2003 |
| WO | 2006015614 A1 | 2/2006 |
| WO | 2006101979 A2 | 9/2006 |
| WO | 2007020563 A1 | 2/2007 |
| WO | 2007021725 A2 | 2/2007 |
| WO | 2008066516 A1 | 6/2008 |
| WO | 2010073656 A1 | 7/2010 |
| WO | 2010143894 A2 | 12/2010 |

OTHER PUBLICATIONS

Gogate N. et al., "Supporting Image and Video Applications in a Multihop Radio Environment Using Path Diversity and Multiple Description Coding", IEEE Transactions on Circuits and Systems for Video Technology, vol. 12, No. 9, Sep. 2002. pp. 777-792.

Hefeeda M., et al., "Promise: PeertoPeer Media Streaming Using CollectCast" Proceedings of the 11th. ACM International Conference on Multimedia. MM'03. Berkeley, CA, Nov. 4-6, 2003; [ACM International Multimedia Conference], New York, NY : ACM, US, vol. Conf. 11, Nov. 2, 2003, pp. 1-10, XP002409310.

International Search Report and Written Opinion—PCT/US2012/039733—ISA/EPO—Oct. 2, 2012.

Jurca D, "Media Flow Rate Allocation in Multipath Networks", IEEE Transactions on Multimedia, vol. 9, No. 6, Oct. 2007. pp. 1227-1240.

Kang, S.S., et al., "A mobile peer-to-peer approach for multimedia content sharing using 3G/WLAN dual mode channels," Wireless Communications & Mobile Computing—Special Issue: WLAN/3G Integration for Next-Generation Heterogeneous Mobile Data Networks, vol. 5 Issue 6, Sep. 2005, pp. 633-645.

Leung M.F., et al., "Broadcast-Based Peer-to-Peer Collaborative Video Streaming Among Mobiles," IEEE Transactions on Broadcasting, vol. 53, No. 1, Mar. 2007, pp. 350-361.

Vutukury, S., et al., "A simple MPLS-based flow aggregation scheme for providing scalable quality of service," Proceedings of SPIE, Quality of Service over Next-Generation Data Network, vol. 4524, pp. 91-98, Aug. 2001, Fig.1.

Ying H et al., "An adaptive algorithm for real-time data transmission in multi-hop overlay networks", Communications and Networking in China (CHINACOM), 2010 5th International ICST Conference on, Aug. 25-27, 2010, pp. 1-5, ISBN: 973-963-9799-97-4.

Taiwan Search Report—TW101118734—TIPO—Aug. 6, 2014.

Papadopouli M., et al.,"Connection Sharing in an Ad Hoc Wireless Network among Collaborating Hosts", In Proc. International Workshop on Network and Operating System Support for Digital Audio and Video (NOSSDAV), 1999, pp. 169-185.

Mao S., et al., "MRTP: A Multiflow Real-Time Transport Protocol for Ad Hoc Networks," IEEE Transactions in Multimedia, Apr. 2006, vol. 8 (2), pp. 356-369.

Narayanan S., et al., "Motivation for a Multi-Flow Real-time Transport Protocol," Published by The Internet Society, Oct. 14, 2004, pp. 12, Retreived from the Internet <URL: http://tools.ietf.org/html/draft-narayanan-mrtp-motivation-00>.

Narayanan S., et al., "MRTP: A Multi-Flow Real-time Transport Protocol," Published by The Internet Society: Jul. 9, 2004, pp. 32, Retreived from the Internet <URL: http://tools.ietf.org/html/draft-narayanan-mrtp-00 >.

Fujino N, et al., "Proposal and Implementation of Multiple Paths Aggregation Using VPN", IPSJ SIG Technical Reports, May 18, 2006, vol. 2006, No. 50, pp. 79-84.

Hwang K.S., et al., "Performance Bounds for Two-Way Amplify-and-Forward Relaying Based on Relay Path Selection," Vehicular Technology Conference, VTC Spring 2009, IEEE 69th, Apr. 26-29, 2009, p. 1-5.

\* cited by examiner

| Bit offset | 0 | 1 | 2 | 3 | 4 | 5 | 6 | 7 |
|---|---|---|---|---|---|---|---|---|
| 0 | Version | | | | Reserved | | | Ext |
| 8 | Message type | | | | | | | |
| 16 | TTL | | | | Packet length | | | |
| 24 | Packet length | | | | | | | |
| 32 | Packet length | | | | Label ID | | | |
| 40 | Label ID | | | | Payload type | | | |

*FIG. 14*

| Bit offset | 0 | 1 | 2 | 3 | 4 | 5 | 6 | 7 |
|---|---|---|---|---|---|---|---|---|
| 0 | Version | | | | Reserved | | | Ext |
| 8 | Message type | | | | | | | |

*FIG. 15*

MULTIPATH OVERLAY NETWORK AND ITS MULTIPATH MANAGEMENT PROTOCOL

BACKGROUND

1. Field

The present disclosure relates generally to communication networks, and more particularly, communication access in Wireless Wide Area Networks (WWANs).

2. Background

Access links, such as a wireless air interface between an access terminal and a base station, are often times the bottlenecks of Wireless Wide Area Networks (WWANs). Nowadays, multimedia applications increasingly introduce a higher traffic load on access links of WWANs, causing unsatisfactory user experience.

SUMMARY

While the capacity of the access link of a device may be limited, the device may use multiple cooperative devices to increase its access capacity. More specifically, an out of band link between the primary node and its cooperative node in conjunction with the access link of the cooperative node may provide an alternative path to the WWAN for the primary node's traffic. Hence, multiple paths can be established between a source and its destination for an application stream.

An overlay network can manage multiple paths for an application stream. In this way, the multipath overlay network is on top of and compatible with the existing network infrastructure. Further, the multipath overlay network may only be perceived as an application by the underlying network.

The instant specification describes an overlay network architecture that serves as a multipath transportation facility between traffic sources and destinations. The multiple paths provided by this multipath overlay network between a pair of source and destination nodes can be used to transport multiple descriptions of a traffic application stream.

The multipath overlay network architecture may be built on top of, and may be compatible with the existing network infrastructure. Interested applications can use the multipath transportation facility provided by this multipath overlay network to enhance its traffic performance, such as throughput, reliability, delay jitter, etc.

In an aspect of the disclosure, a source apparatus includes a processing system and a memory coupled to the processing system. The processing system is configured to support a multimedia communication session for sending data over a plurality of paths from the source to an aggregator, where a first path of the plurality of paths includes at least one helper node selected by the source or the aggregator.

In another aspect of the disclosure, an aggregator apparatus includes a processing system and a memory coupled to the processing system. The processing system is configured to support a multimedia communication session for sending data over a plurality of paths from a source to the aggregator, where a first path of the plurality of paths includes at least one helper node selected by the source or the aggregator.

In still another aspect of the disclosure, an aggregator helper apparatus includes a processing system and a memory coupled to the processing system. The processing system is configured to support a multimedia communication session for sending data over a plurality of paths from a source to the aggregator, where a first path of the plurality of paths includes the aggregator helper, selected by the aggregator.

In yet another aspect of the disclosure, a source helper apparatus includes a processing system and a memory coupled to the processing system. The processing system is configured to support a multimedia communication session for sending data over a plurality of paths from a source to the aggregator, where a first path of the plurality of paths comprising the source helper, selected by the source.

Another aspect of the disclosure provides a method of communication from a source. The method includes supporting a multimedia communication session for sending data over a plurality of paths from the source to an aggregator, where a first path of the plurality of paths includes at least one helper node selected by the source or the aggregator.

In another aspect of the disclosure, a method of communication from an aggregator is provided. The method includes supporting a multimedia communication session for sending data over a plurality of paths from a source to the aggregator, where a first path of the plurality of paths includes at least one helper node selected by the source or the aggregator.

In another aspect of the disclosure, a method of communication from an aggregator is provided. The method includes supporting a multimedia communication session for sending data over a plurality of paths from a source to the aggregator, where a first path of the plurality of paths includes at least one helper node selected by the source or the aggregator.

Yet another aspect of the disclosure provides a method of communication utilizing a source helper. The method includes supporting a multimedia communication session for sending data over a plurality of paths from a source to an aggregator, where a first path of the plurality of paths includes the source helper, selected by the source.

In another aspect of the disclosure, a source apparatus includes means for supporting a multimedia communication session for sending data over a plurality of paths from the source to an aggregator, where a first path of the plurality of paths includes at least one helper node; and means for selecting, by the source, the at least one helper node.

In still another aspect of the disclosure, an aggregator apparatus includes means for supporting a multimedia communication session for sending data over a plurality of paths from a source to the aggregator, where a first path of the plurality of paths includes at least one helper node; and means for selecting, by the aggregator, the at least one helper node.

Yet another aspect of the disclosure provides an aggregator helper apparatus. The aggregator helper apparatus includes means for supporting a multimedia communication session for sending data over a plurality of paths from a source to an aggregator, where a first path of the plurality of paths includes the aggregator helper; and means for receiving a selection by the aggregator.

Still another aspect of the disclosure provides a source helper apparatus. The source helper includes means for supporting a multimedia communication session for sending data over a plurality of paths from a source to an aggregator, where a first path of the plurality of paths includes the source helper; and means for receiving a selection by the source.

In still another aspect of the disclosure, a computer program product includes a computer-readable medium having code for supporting a multimedia communication session for sending data over a plurality of paths from a source apparatus to an aggregator apparatus, where a first path of the plurality of paths includes at least one helper node selected by the source or the aggregator.

BRIEF DESCRIPTION OF THE DRAWINGS

FIG. 14 is an example of a packet header of multipath overlay network data packets.

FIG. 15 is an example of a packet header of multipath overlay network signaling messages.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
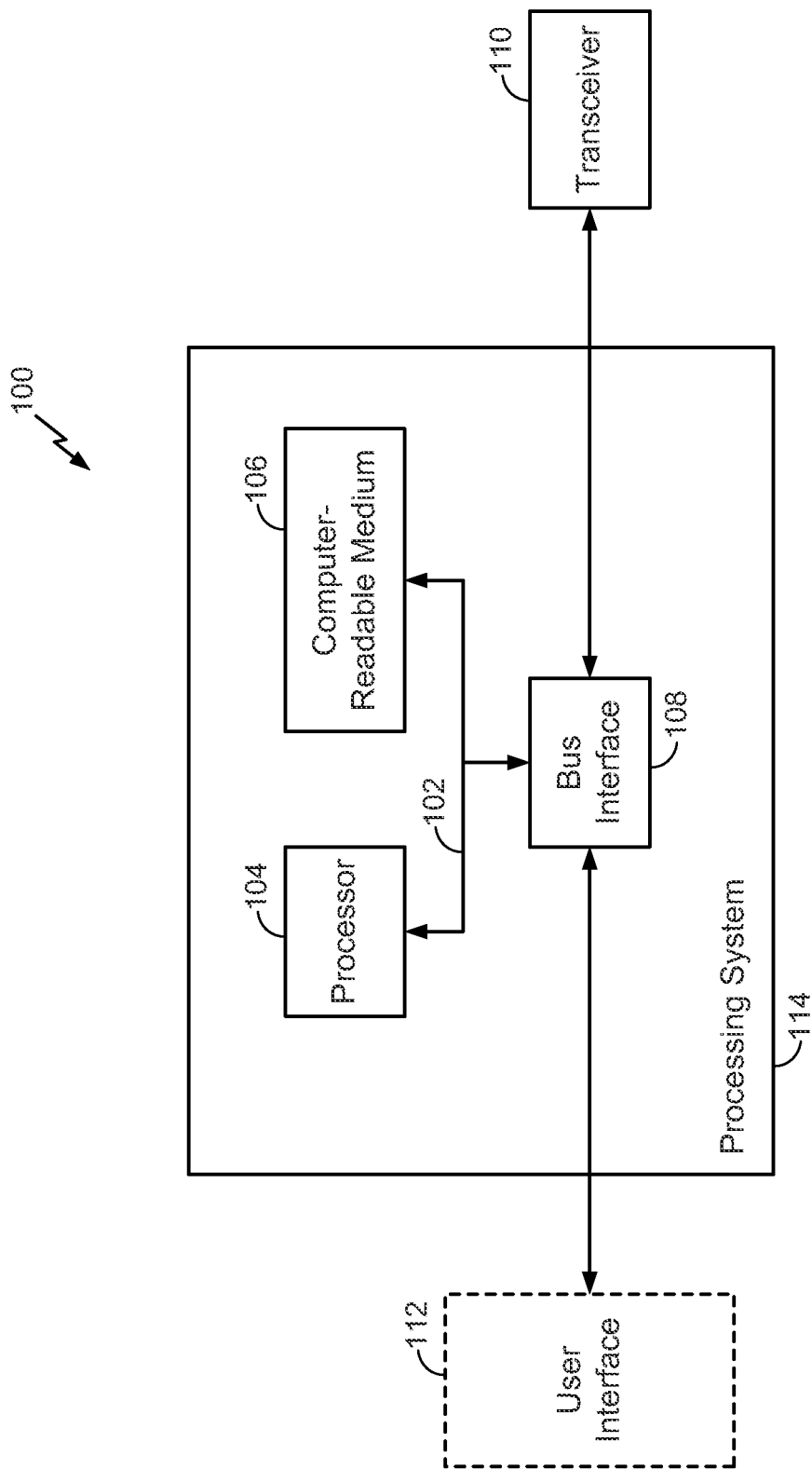
FIG. 1 is a block diagram illustrating an example of a hardware implementation for an apparatus employing a processing system.

FIG. 1 is a block diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

The various concepts presented throughout this disclosure may be implemented across a broad variety of telecommunication systems, network architectures, and communication standards. By way of example, various aspects may be implemented in UMTS systems such as W-CDMA, TD-CDMA, TD-SCDMA, High Speed Packet Access (HSPA), and HSPA+. Various aspects may also be implemented in systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or any other suitable system. The actual telecommunication standard and/or network architecture employed will depend on the specific implementation and the overall design constraints imposed on the system.

Figure 2:
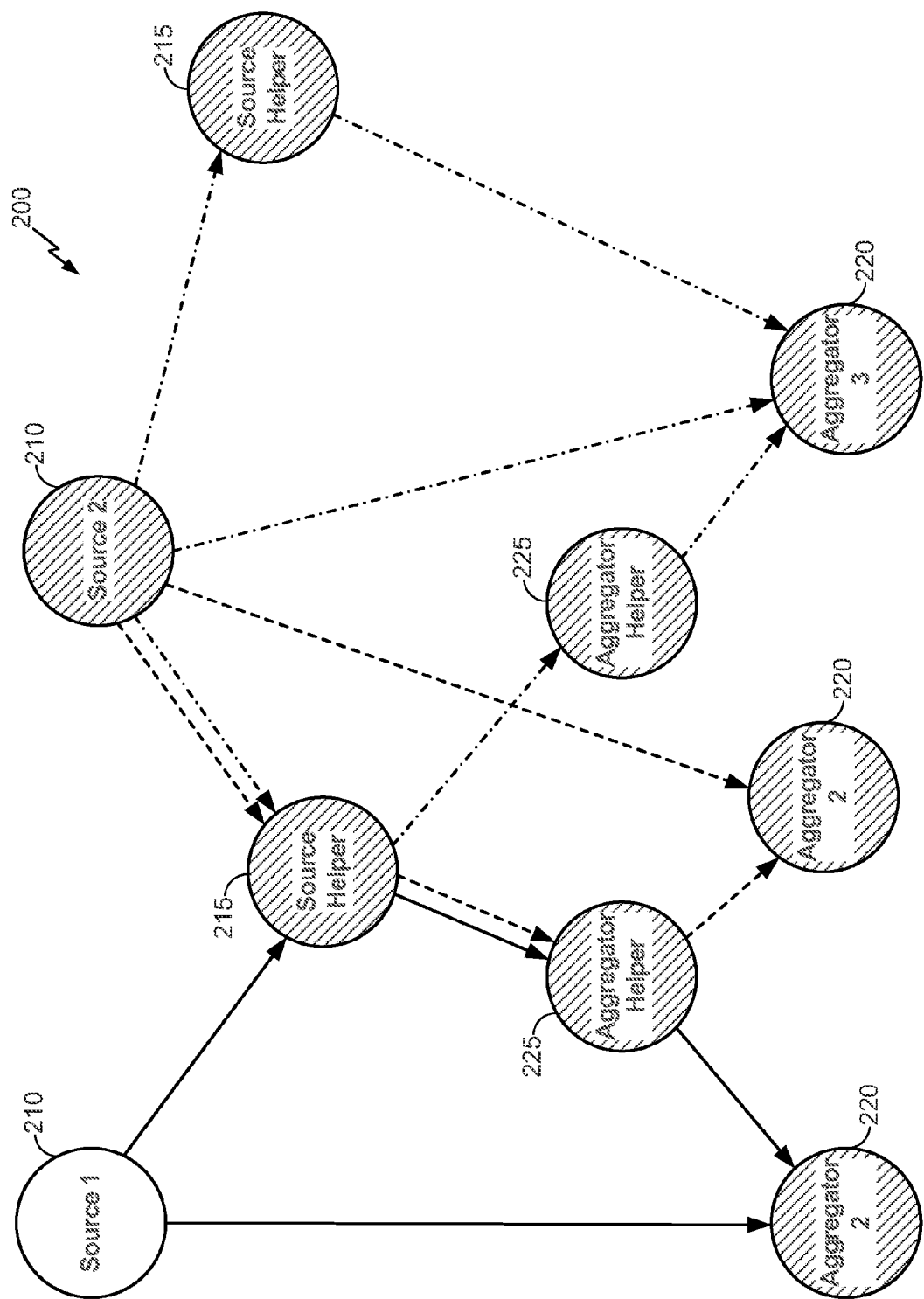
FIG. 2 is an illustration of a multipath overlay network.

FIG. 2 is an illustration of the architecture of a multipath overlay network 200 in accordance with some aspects of the present disclosure. Here, the multipath overlay network 200 includes various paths between different nodes such as one or more traffic sources ("source") 210, and one or more traffic destinations ("aggregator") 220. The source 210 and the aggregator 220 may each "discover" specific "helpers" to establish the paths, and to route substreams of a streaming session between the respective source 210 and aggregator 220. Each multimedia communication session ("streaming session") may include a source 210, one or more source helpers 215 (optional), one or more aggregator helpers 225 (optional), and an aggregator 210. For example, in one path, a traffic substream may flow from a source 210 to a source helper 215, then to an aggregator helper 225, and then to an aggregator 220. The selected source helper 215 and aggregator helper 225 thus serve to relay the substream of the streaming multimedia communication session from the source 210 to the aggregator 220. If data is transmitted from the source 210 directly to the aggregator 220, that data may be characterized as a first description of the streaming session. Substreams of data transmitted over other paths, e.g., utilizing one or more helpers, may be characterized as second and subsequent descriptions of the streaming session. Thus, multiple descriptions of the streaming session may be transmitted over separate paths and reassembled at the aggregator 220 for an enhanced quality of service by virtue of the additional bandwidth being utilized. The source helper 215 and the aggregator 210 may thus "cooperatively help" the source 110 and the aggregator 120 to achieve, for example, a streaming communication that has a quality greater than a threshold value of quality, in order to enhance a user experience.

In the above-described multipath overlay network 200, the sources 210 are the traffic sources of a streaming session, and the aggregators 220 are the traffic destinations of the streaming session. A source helper 215 is a cooperative node, which may be selected by the source 210 to receive and retransmit a description of the session in a substream. An aggregator helper 225 is a cooperative node, which may be selected by the aggregator 220 to receive and retransmit a description of the session in a substream.

In some aspects of the disclosure, a source helper 215 and an aggregator helper 225 can be a helper for one or more traffic sessions at the same time. That is, a node can take different roles for different traffic sessions, i.e., as a source 210, a source helper 215, an aggregator 220, and/or an aggregator helper 225.

Multipath Overlay Network Protocol Stack

Figure 3:
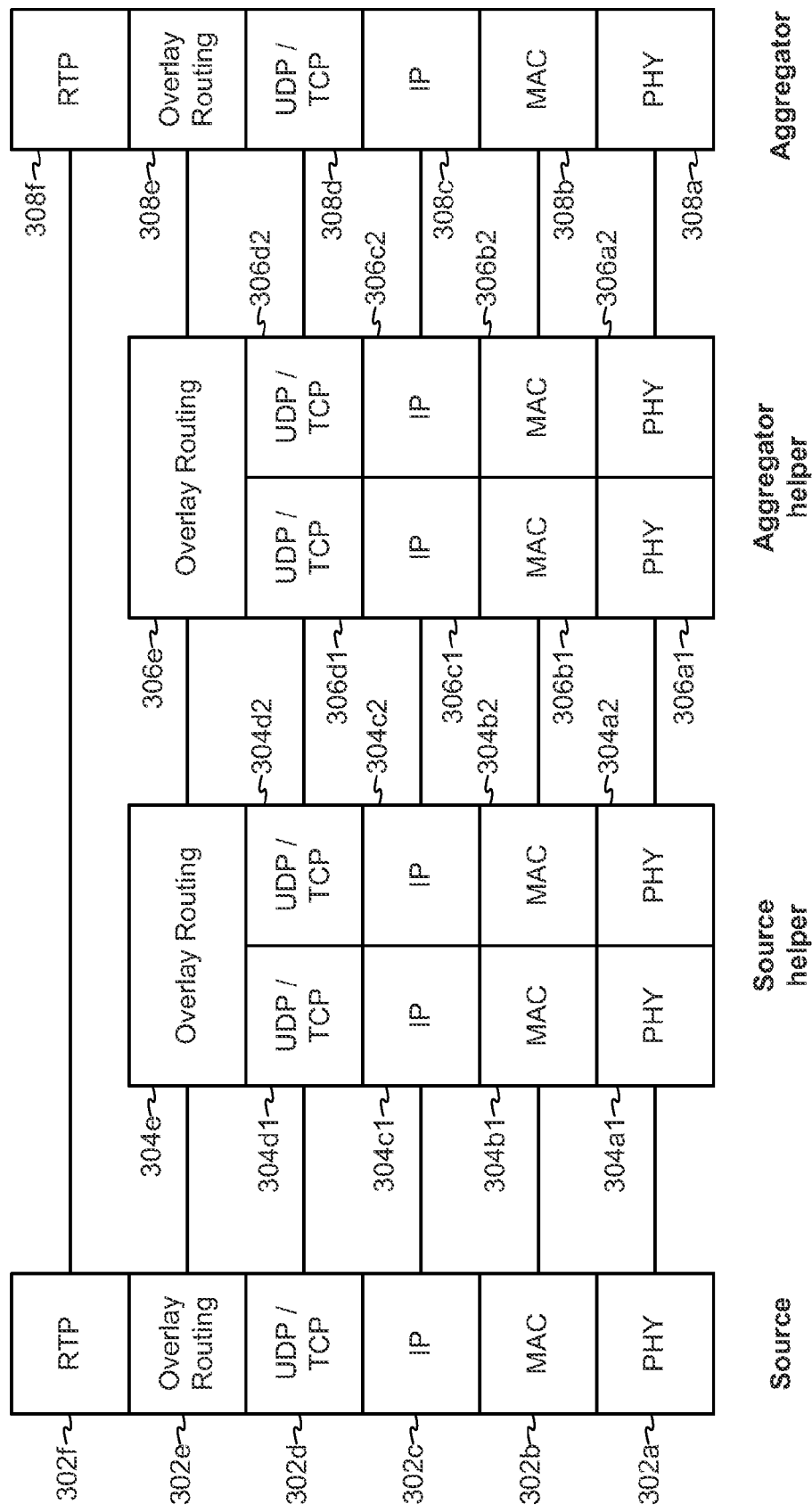
FIG. 3 illustrates a protocol stack of the overlay network data plane.

FIG. 3 illustrates protocol stacks of certain nodes in the overlay network data plane in accordance with some aspects of the disclosure. The data plane can be utilized to deliver the multimedia data across the multipath overlay network 200. In some aspects, the data packets may traverse multiple hops on the multipath overlay network 200.

In the illustrated example, various data plane protocol stacks are illustrated for certain nodes in a particular path including a source 302, a source helper 304, an aggregator helper 304, and an aggregator 306. In some aspects, the protocol stack for the source 302 includes a physical layer (PHY) 302$a$, a medium access control layer (MAC) 302$b$, an internet protocol layer (IP) 302$c$, a user datagram protocol/transmission control protocol layer (UDP/TCP) 302$d$, an overlay routing layer 302$e$, and a real-time transport protocol layer (RTP) 302$f$. The protocol stack for the source helper 304 includes, at an input side, a PHY layer 304$a$1, a MAC layer 304$b$1, an IP layer 304$c$1, and a UDP/TCP layer 304$d$1; and at an output side, a PHY layer 304$a$2, a MAC layer 304$b$2, an IP layer 304$c$2, and a UDP/TCP layer 304$d$2. The source helper 304 further includes an overlay routing layer 304$e$. The protocol stack for the aggregator helper 306 includes, at an input side, a PHY layer 306$a$1, a MAC layer 306$b$1, an IP layer 306$c$1, and a UDP/TCP layer 306$d$1; and at an output side, a PHY layer 306$a$2, a MAC layer 306$b$2, an IP layer 306$c$2, and a UDP/TCP layer 306$d$2. The aggregator helper 306 further includes an overlay routing layer 306$e$. The protocol stack for the aggregator 308 includes a PHY layer 308$a$, a MAC layer 308$b$, an IP layer 308$c$, a UDP/TCP layer 308$d$, an overlay routing layer 308$e$, and an RTP layer 308$f$.

In some aspects, the multipath overlay network 200, utilizing the protocol stack illustrated in FIG. 3, utilizes a UDP or a TCP port (e.g., a predetermined UDP or TCP port) for transporting overlay network data packets.

In some aspects of the disclosure, if a data path segment exists between a pair of nodes in the multipath overlay network 200, an end-to-end UDP/IP transport can be utilized between those nodes. For example, an end-to-end UDP/IP transport can be utilized between the source 302 and the source helper 304; between the source 302 and the aggregator helper 306; between the source helper 304 and the aggregator 308; and between the aggregator helper 306 and the aggregator 308.

Figure 4:
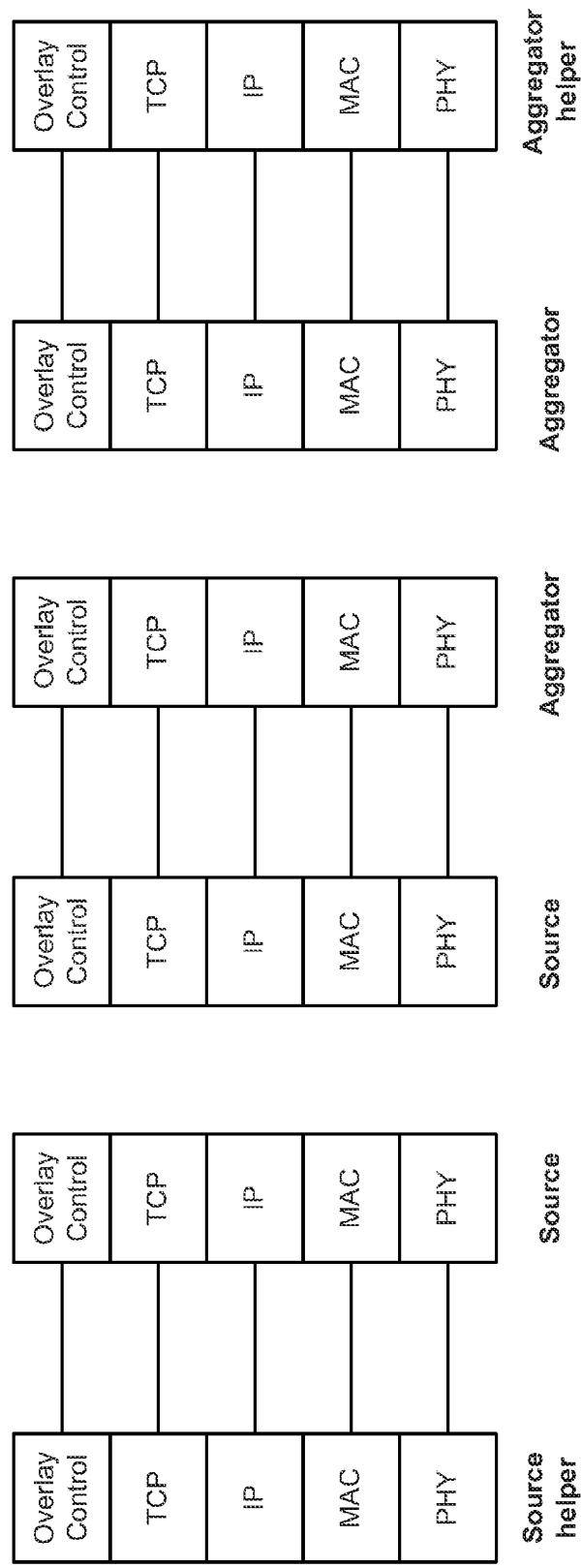
FIG. 4 illustrates a protocol stack of the control plane.

FIG. 4 illustrates a protocol stack of the overlay network control plane in accordance with some aspects of the disclosure. The control plane of the multipath overlay network may be used to setup, release, and switch a path in the data plane between a respective source 210 and aggregator 220. In the illustrated example of the overlay network control plane connections between pairs of nodes, each of the respective nodes includes a PHY layer, a MAC layer, an IP layer, and a TCP layer. In addition, each of the respective nodes includes an overlay control layer.

In an aspect of the disclosure, multipath overlay network signaling messages may traverse a single hop on the multipath overlay network. That is, if a data path segment is expected between a respective pair of nodes (e.g., between a source helper 402$a$ and a source 402$b$; between a source 404$a$ and an aggregator 404$b$; or between an aggregator 406$a$ and an aggregator helper 406$b$), TCP/IP transport can be utilized between those nodes. In some implementations, the multipath overlay network uses a transmission control protocol (TCP) port (e.g., a predetermined TCP port) for transporting overlay network signaling messages.

Multipath Overlay Network Routing

The multipath overlay network routing function uses a label switching mechanism to route the data traffic. Here, an input label ID can be used by the source helper 215, the aggregator helper 225, and the aggregator 210 to identify the data packets of a unique stream (e.g., a substream) received by the underlying node. Similarly, an output label ID can be used by the source 210, the source helper 215, and the aggregator helper 225 to identify the data packets of a unique stream (e.g., a substream) to be sent by the underlying node. The input label ID may be assigned by the recipient of the data packet during the signaling phase, and in one aspect, may be unique only from the perspective of the recipient. The output label ID may be assigned by the sender of the data packet.

When a node in the multipath overlay network receives a multipath overlay network data packet, the node examines the input label ID and then sends out this packet to a next hop overlay network address, which may be the destination of the packet in the underlying network. The packet may be tagged with the corresponding output label ID. An example of a switching table is shown in Table 1.

TABLE 1

Switching Table

| Node | Input Label ID | Output Label ID | Next Hop Overlay Network Address |
|---|---|---|---|
| Source |  | X | X |
| Source Helper | X | X | X |
| Aggregator Helper | X | X | X |
| Aggregator | X |  |  |

Figure 5:
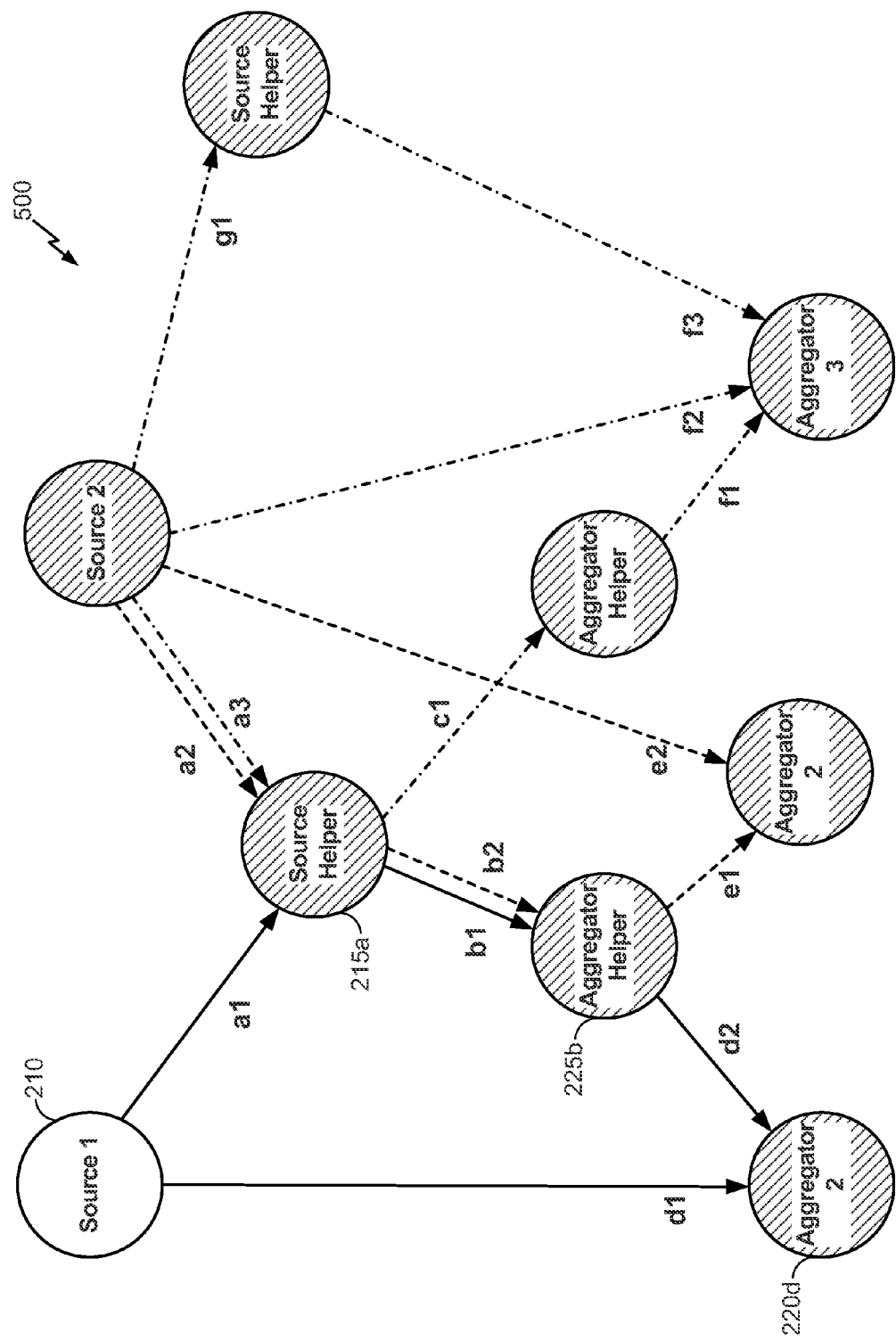
FIG. 5 illustrates an example of a label distribution.

FIG. 5 is an illustration of a multipath overlay network substantially similar to that illustrated in FIG. 2, further including details to illustrate distribution of label IDs. In the illustrated example, the label IDs that are assigned by a common node are tagged with the same alphabetic character.

For example, a first overlay network data packet may be sent from source 1 210 along a direct path to aggregator 2 220$d$. Here, the source 1 210 may assign an output label ID of d1, corresponding to the overlay network address of the aggregator 2 220$d$; and similarly, because this particular data packet is to follow a direct path, the next hop overlay network address also may correspond to that of aggregator 2 220$d$. When the data packet arrives at the aggregator 2 220$d$, the data packet then receives an input label ID corresponding to the overlay network address of the source.

Further, a second overlay network data packet may be sent from source 1 210 along an alternative path to aggregator 2 220$d$. Here, the alternative path includes source helper 215$a$ and aggregator helper 225$b$. Thus, the source 1 210 may assign an output label ID of d1, corresponding to the overlay network address of aggregator 2 220$d$. However, because this particular data packet is following the alternative path, the next hop overlay network address corresponds to that of source helper 215$a$. At the next hop, the source helper 215$a$ assigns an input label ID corresponding to the overlay network address of source 1 210, since that node was the source of the data packet; and retains the output label ID of aggregator 2 220$d$. The source helper 215$a$ assigns a next hop overlay network address corresponding to that of the aggregator helper 225$b$. At the next hop, the aggregator helper 225$b$ assigns an input label ID corresponding to the overlay network address of source helper 215a, and retains the output label ID of aggregator 2 220d. The aggregator helper 225b assigns a next hop overlay network address corresponding to that of aggregator 2 220d. At the next hop, which is the destination of the data packet, aggregator 2 220d assigns an input label ID corresponding to the overlay network address of the aggregator helper 225b.

Of course, those skilled in the art will recognize that this is only one particular implementation, and other forms of switching tables and addressing of data packets may be utilized within the spirit of the present disclosure and the scope of the claims.

State and SDL Diagrams of an Aggregator

Figure 6:
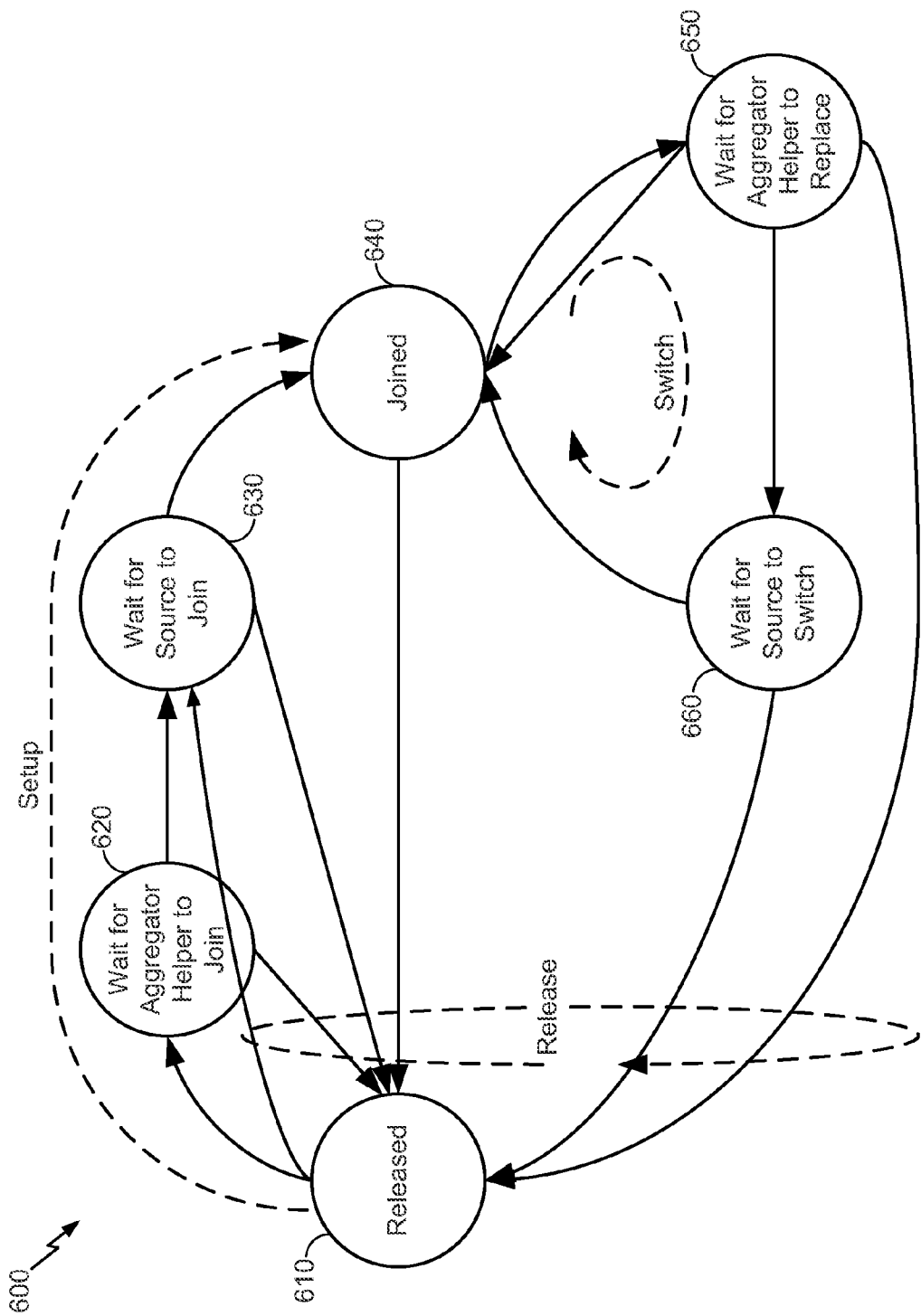
FIG. 6 illustrates a state transition diagram.

Referring once again to the multipath overlay network 200 illustrated in FIG. 2, it is seen that an aggregator 220 may be capable of receiving information over multiple paths from a corresponding source 210. In an aspect of the disclosure, as illustrated in FIG. 6, an aggregator 220 may include a master state machine that governs the path management of the multiple paths it has with the corresponding source 210. In a further aspect of the disclosure, a master state machine for an aggregator 220 can include multiple atomic state machines. Here, each atomic state machine governs the path management of a single path between the aggregator 220 and the corresponding source 210.

A state transition diagram 600 for an aggregator 220 in accordance with some aspects of the disclosure is shown in FIG. 6. For each atomic state machine of the aggregator 220, the aggregator 220 has states including a Released state 610; a Wait for Aggregator Helper to Join state 620; a Wait for Source to Join state 630; a Joined state 640; a Wait for Aggregator Helper to Replace state 650; and a Wait for Source to Switch state 660. At some of the states, as described below, the aggregator 220 may utilize timers including an Original Helper Join timer, a Replacement Helper Join timer, and a Source Join timer. Further, in some of the states, the aggregator 220 may utilize a binary state variable "helper_active" for state reduction, with, e.g., a default value set to false. Signaling messages that are not designed to be handled as inputs at a certain state may be queued for delayed processing.

Figure 7A:
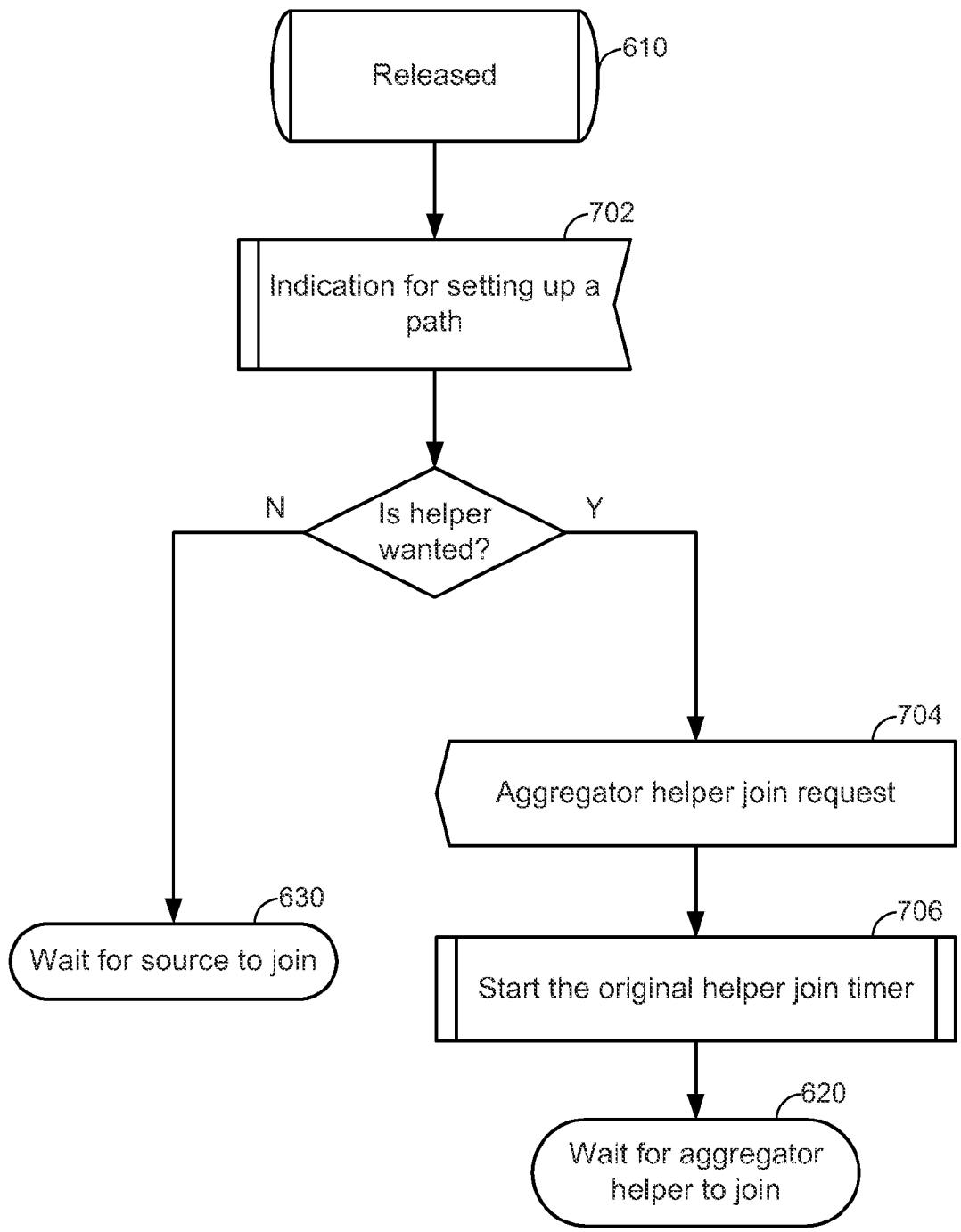
FIGS. 7A-7F illustrate Specification and Description Language (SDL) diagrams for an Aggregator.

FIGS. 7A-7F are specification and description language (SDL) flow charts illustrating state transitions in the state transition diagram 600 illustrated in FIG. 6. As illustrated in FIG. 7A, at the Released state 610, the path between the aggregator 220 and the node corresponding to this particular atomic state machine is released. Here, the aggregator 220 may transition to the Wait for Source to Join state 630 or the Wait for Aggregator Helper to Join state 620. The aggregator 220 may receive an indication 702, e.g., from a source 210, for setting up a path. If the aggregator 220 is not in need of a helper, then the aggregator 220 may move to the Wait for Source to Join state 630. If the aggregator 220 desires a helper, the aggregator 220 may send an Aggregator Helper Join Request message 704 to the corresponding aggregator helper 225, and start an Original Helper Join timer 706. The aggregator 220 may then enter the Wait for Aggregator Helper to Join state 620.

Figure 7B:
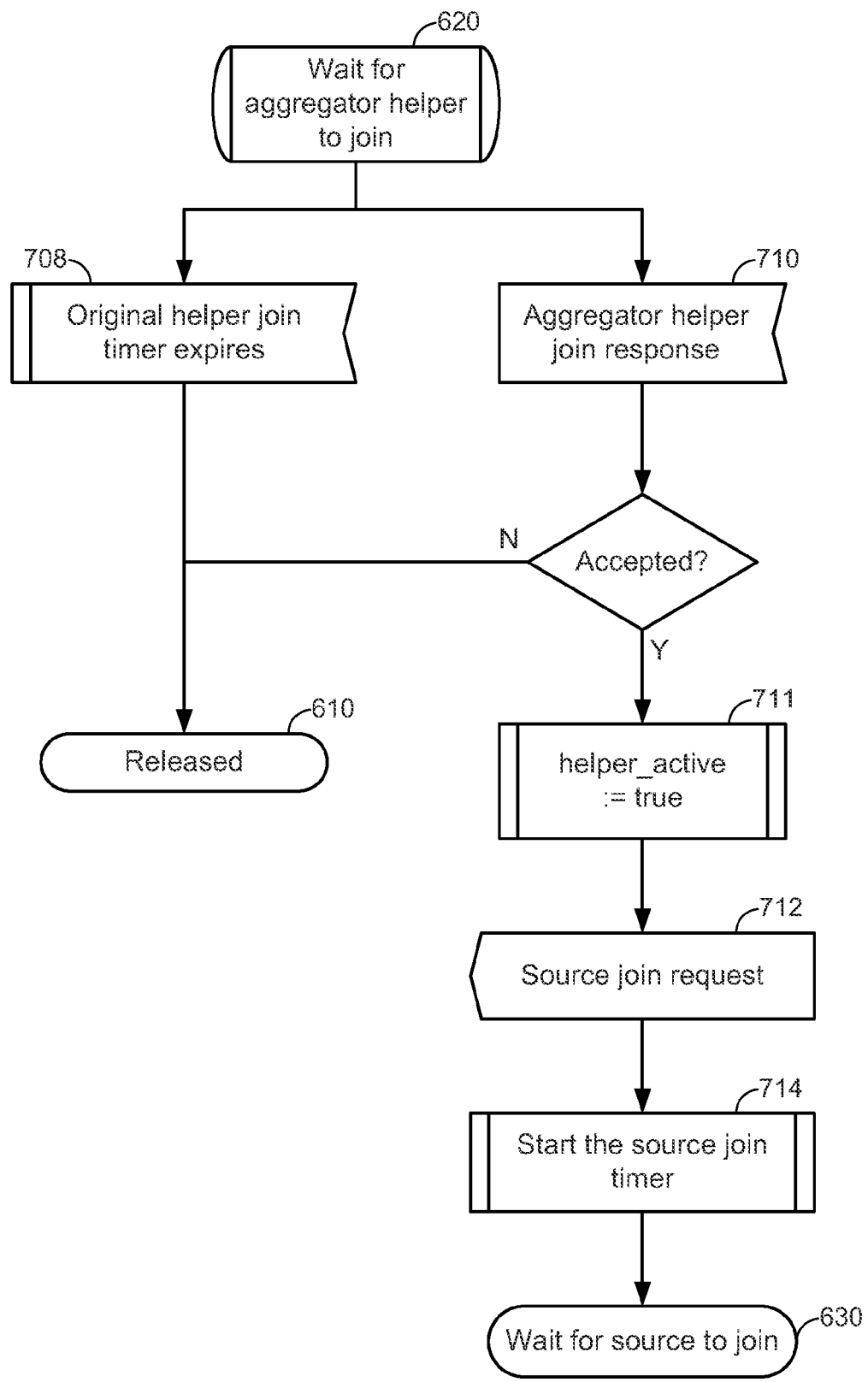

As illustrated in FIG. 7B, at the Wait for Aggregator Helper to Join state 620, the aggregator 220 has sent an Aggregator Helper Join Request message, and is awaiting, for the duration of the Original Helper Join timer, an Aggregator Helper Join Response message. Here, if the Original Helper Join timer expires 708, the aggregator 220 enters the Released state 610. However, prior to the expiration of the Original Helper Join timer, the aggregator 220 may receive an Aggregator Helper Join Response message 710. If the message is not accepted, the aggregator 220 may enter the Released state 610. If the message is accepted, the aggregator 220 may then set the helper_active variable to true 711, send a Source Join Request message 712, start a Source Join timer 714, and enter the Wait for Source to Join state 630.

Figure 7C:
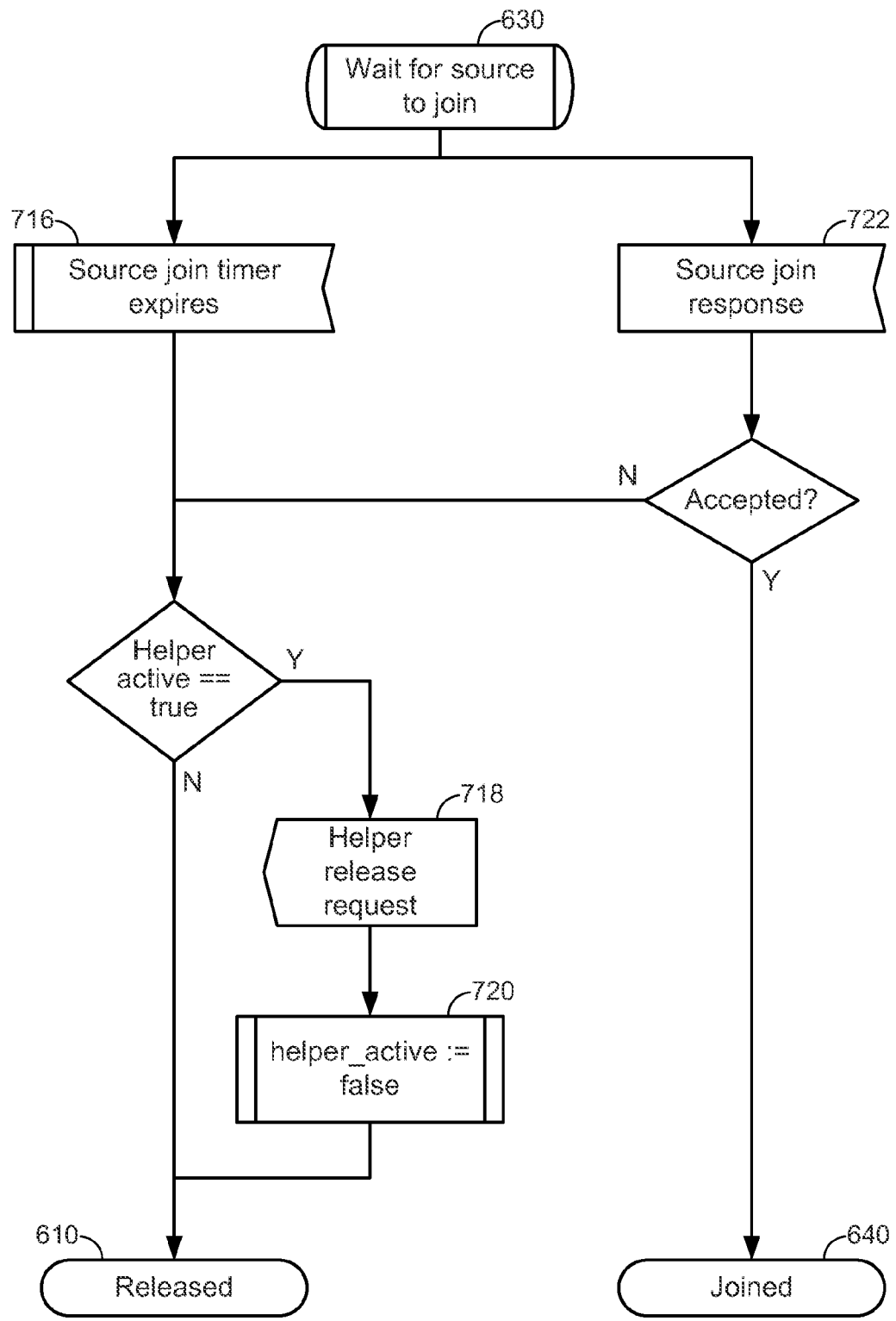

As illustrated in FIG. 7C, at the Wait for Source to Join state 630, the aggregator 220 has sent a Source Join Request message, and is awaiting, for the duration of the Source Join timer, a Source Join Response message. Here, if the Source Join timer expires 716, and if the helper_active variable is false, the aggregator 220 may enter the Released state 610. However, if the Source Join timer expires 716, and the helper_active variable is true, then the aggregator may wish to release the helper corresponding to the helper_active variable, so it may send a Helper Release Request message 718 to its helper, set the helper_active variable to false, and thereafter enter the Released state 610. However, prior to the expiration of the Source Join timer, the aggregator 220 may receive a Source Join Response message 722 from the source 210 in response to the Source Join Request message. If the aggregator 220 does not accept the Source Join Response message, then the aggregator 220 follows the process outlined just above to enter into the Released state 610. If the aggregator 220 accepts the Source Join Response message from the source 210, then the aggregator 220 enters the Joined state 640.

Figure 7D:
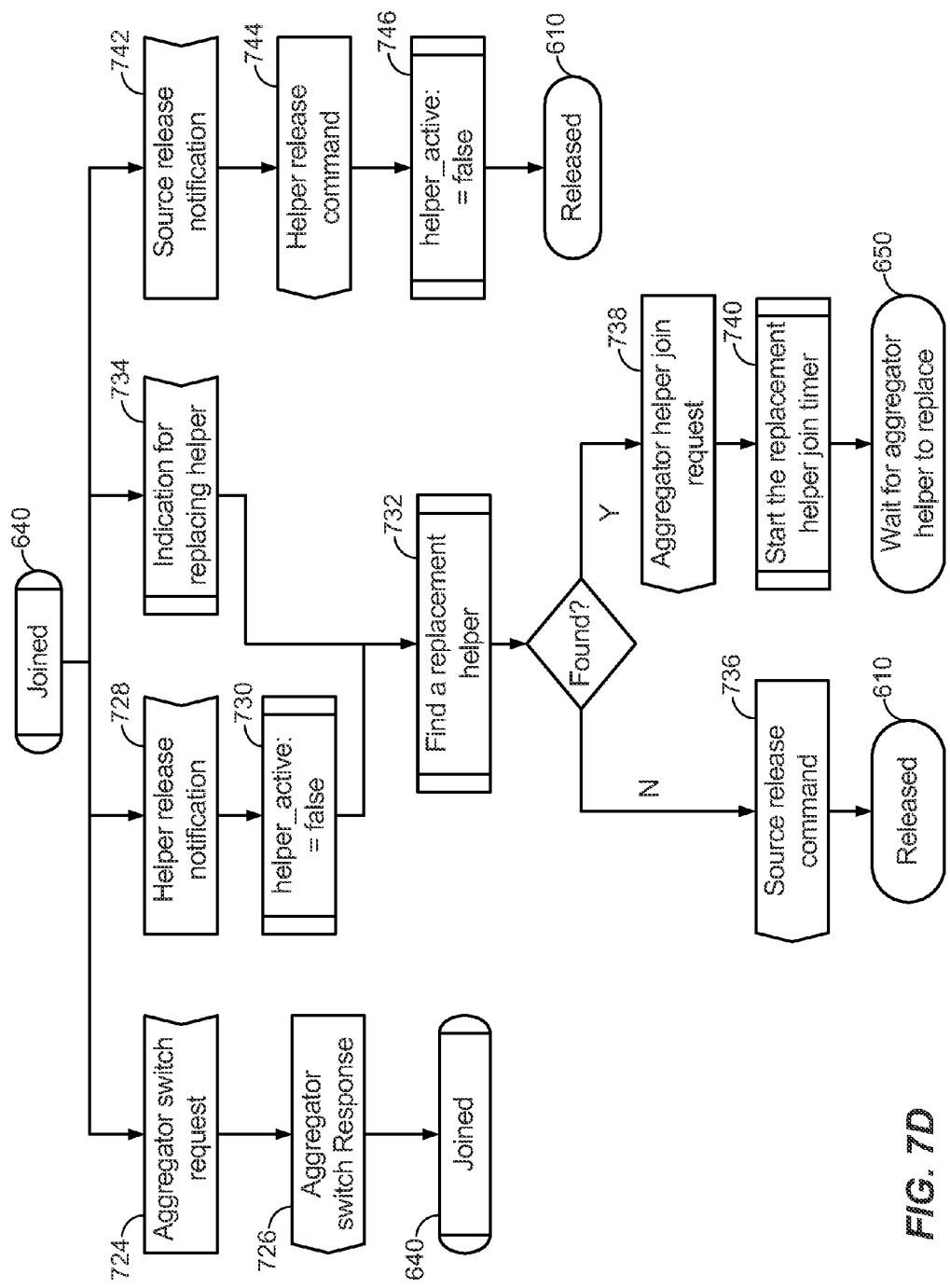

As illustrated in FIG. 7D, at the Joined state 640, a path from the aggregator 220 to a corresponding source 210 exists, that path including the node corresponding to this particular atomic state machine. Here, the aggregator 220 may receive an Aggregator Switch Request message 724 from the source 210, to request the aggregator 220 to switch a path between the source 210 and the aggregator 220. The aggregator 220 may then respond to the source 210 with an Aggregator Switch Response message 726 and return to the Joined state 640. Further, in the Joined state 640, the aggregator 220 may receive a Helper Release Notification message 728 from a helper node, indicating to release a particular path utilizing that node, between the source 210 and the aggregator 220. Here, to release the path, the aggregator 220 may set the helper_active variable to false 730, and seek to find a replacement helper 732. In the Joined state 640, the aggregator 220 may also receive an indication for replacing a joined helper 734, in response to which the aggregator 220 similarly may seek to find a replacement helper 732. Here, if a replacement helper is not found, the aggregator 220 may send a Source Release Command message 736 to the source 210 to release the path between the source 210 and the aggregator 220, and enter the Released state 610. If a replacement helper is found, the aggregator 220 may send an Aggregator Helper Join Request message 738 to the found aggregator helper 225, seeking to set up the path between the source 210 and the aggregator 220 utilizing the found aggregator helper 225. The aggregator 220 may then start the Replacement Helper Join timer 740, and enter the Wait for Aggregator Helper to Replace state 650. Further, in the Joined state 640, the aggregator 220 may receive a Source Release Notification message 742 from the source 210 indicating to release a path between the source 210 and the aggregator 220. Here, the aggregator 220 may send a Helper Release Command message 744 to a joined helper to release a path between the source 210 and the aggregator 220 utilizing the corresponding helper, and set the helper_active variable false 746, before entering the Released state 610.

Figure 7E:
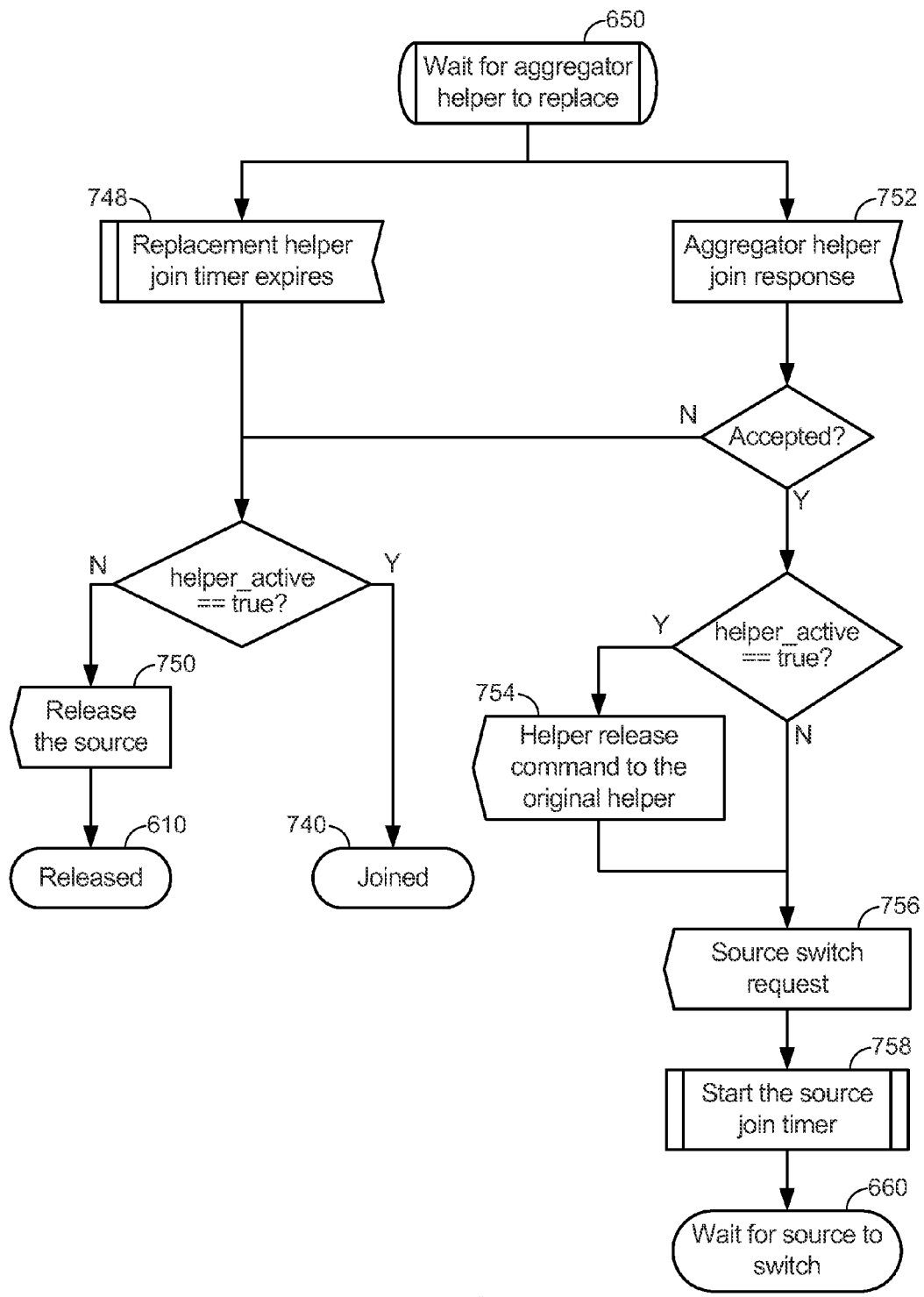

As illustrated in FIG. 7E, at the Wait for Aggregator Helper to Replace state 650, the aggregator 220 has sent an Aggregator Helper Join Request message to a found replacement aggregator helper 225, and is awaiting, for the duration of the Replacement Helper Join timer, an Aggregator Helper Join Response message from the found replacement aggregator helper 225. Here, if the Replacement Helper Join timer expires 748, but if the helper_active variable is false (indicating that the aggregator 220 is not joined to a helper node), the aggregator 220 sends a Source Release Command message 750 to the source 210 to release the path between the source 210 and the aggregator 220, and enters the Released state 610. However, if the Replacement Helper Join timer expires 748, and the helper_active variable is true, then the aggregator 220 enters the Joined state 640, retaining the path between the source 210 and the aggregator 220 that includes the helper corresponding to this particular atomic state machine. Further, prior to the expiration of the Replacement Helper Join timer, the aggregator 220 may receive an Aggregator Helper Join Response message 752 from a corresponding aggregator helper 225 in response to an Aggregator Helper Join Request message. If the aggregator 220 does not accept the Aggregator Helper Join Response message, then the aggregator 220 follows the process outlined above to enter into either the Released state 610 or the Joined state 640. If the aggregator 220 accepts the Aggregator Helper Join Response message from the aggregator helper 225, and if the helper_active variable is true, the aggregator 220 may send a Helper Release Command message 754 to the original helper to release the corresponding path between the source 210 and the aggregator 220 utilizing that helper node. If the helper_active variable is false, the aggregator 220 may skip the sending of the Helper Release Command message 754. Next, the aggregator 220 may send a Source Switch Request message 756 to the source 210 to request the source 210 to switch a path between the source 210 and the aggregator 220, start the Source Join timer 758, and enter the Wait for Source to Switch state 660.

Figure 7F:
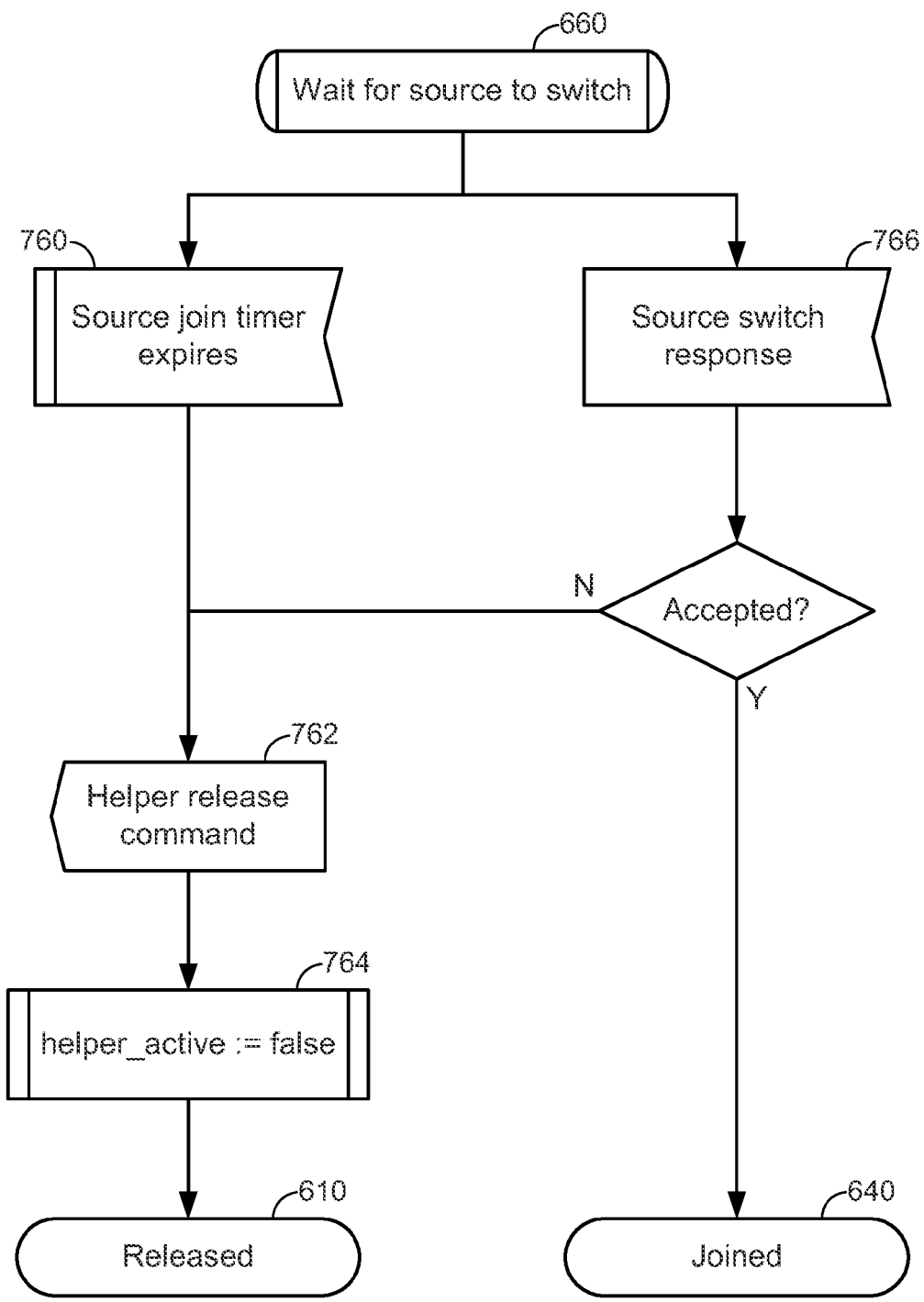

As illustrated in FIG. 7F, at the Wait for Source to Switch state 660, the aggregator 220 has sent a Source Switch Request message, and is awaiting, for the duration of the Source Join timer, a Source Switch Response message. Here, if the Source Join timer expires 760, the aggregator 220 may send a Helper Release command 762 to the respective helper, to release the corresponding path between the source 210 and the aggregator 220 utilizing that helper node. The aggregator 220 may then set the helper_active variable to false 764, and enter the Released state 610. However, prior to the expiration of the Source Join timer, the aggregator 220 may receive a Source Switch Response message 766 from the source 210 in response to the Source Switch Request message. If the aggregator 220 does not accept the Source Switch Response message, the aggregator 220 may follow the process outlined just above to enter into the Released state 610. If the aggregator 220 accepts the Source Switch Response message 766, then the aggregator 220 enters the Joined state 640.

State and SDL Diagrams of an Aggregator Helper

Figure 8:
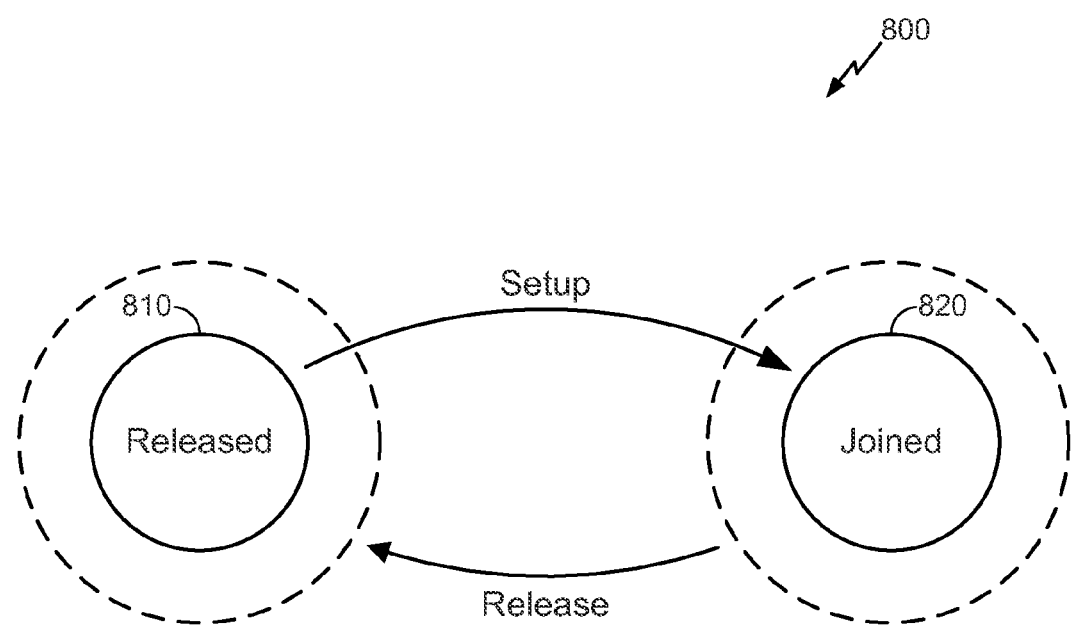
FIG. 8 illustrates a state transition diagram for an aggregator helper.

FIG. 8 is an illustration of a state machine 800 corresponding to an aggregator helper 225, illustrated in FIG. 2. An aggregator helper 225 may include a Released state 810 and a Joined state 820. That is, the aggregator helper 225 may be joined to take part in forming a path, or may be released as a cooperative node.

Figure 9A:
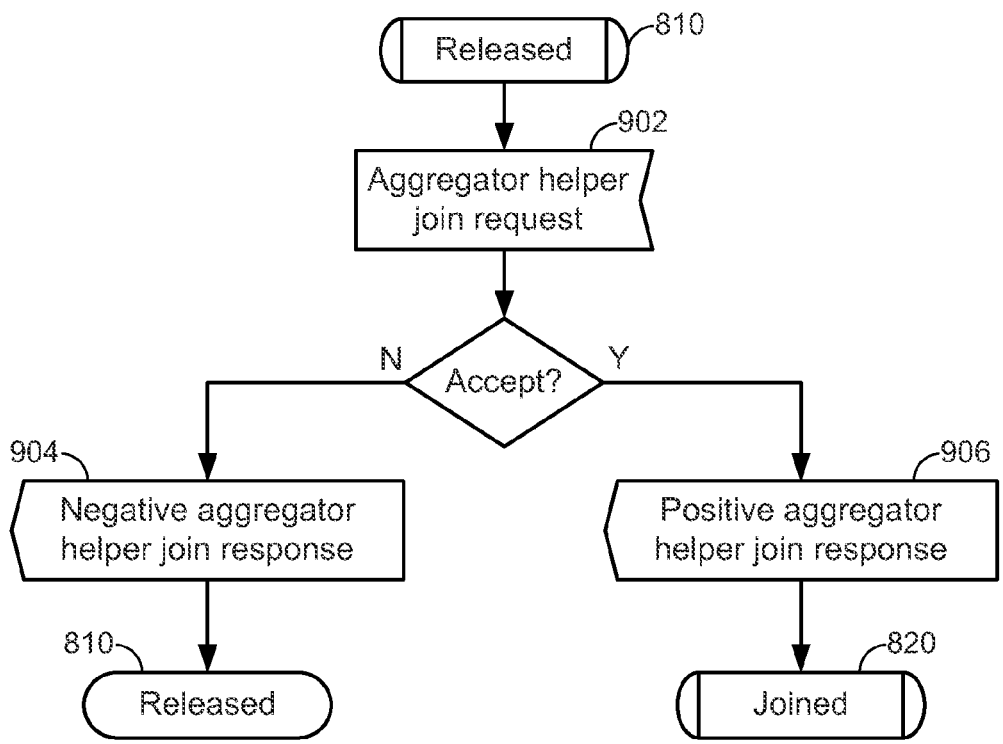
FIGS. 9A-9B illustrate an SDL diagram for an aggregator helper.
Figure 9B:
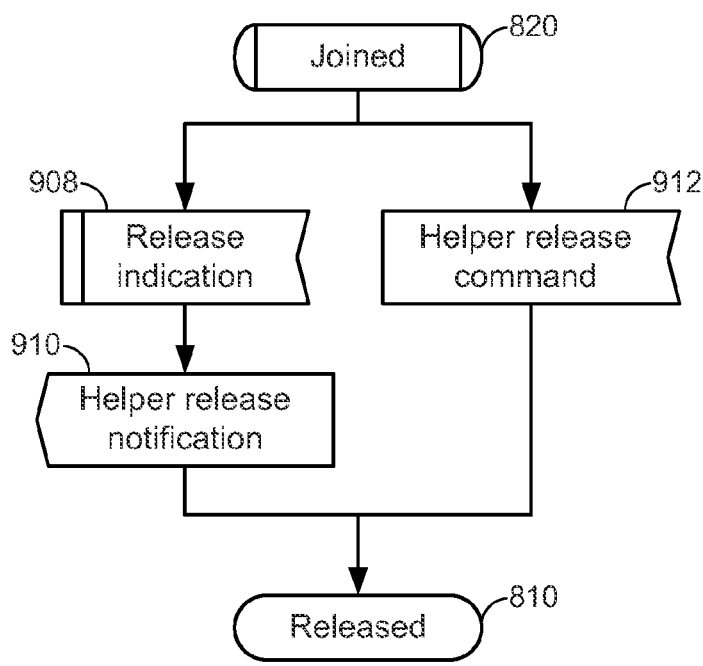

FIGS. 9A-9B are SDL flow charts illustrating state transitions in the state transition diagram 800 illustrated in FIG. 8. As illustrated in FIG. 9A, at the Released state 810, the aggregator helper 225 does not act as a cooperative node for a path between a source 210 and an aggregator 220. Here, the aggregator helper 225 may receive an Aggregator Helper Join Request message 902 from an aggregator 220 to request the aggregator helper 225 set up a path between a source 210 and the aggregator 220. If the aggregator helper 225 does not accept the Aggregator Helper Join Request message, the aggregator helper 225 may send a Negative Aggregator Helper Join Response message 904 to the aggregator 220, and return to the Released state 810. If the aggregator helper 225 accepts the Aggregator Helper Join Request message, the aggregator helper 225 may send a Positive Aggregator Helper Join Response message 906 to the aggregator 220, and enter the Joined state 820, in which the aggregator helper 225 acts as a cooperative node in a path between a source 210 and the aggregator 220.

As illustrated in FIG. 9B, at the Joined state 820, the aggregator helper 225 acts as a cooperative node in a path between a source 210 and an aggregator 220. Here, the aggregator helper 225 may receive a Release Indication message 908, indicating to release the path between the source 210 and the aggregator 220, including the aggregator helper 225. In response, the aggregator helper 225 may send a Helper Release Notification message 910 to the aggregator 220 to release the corresponding path. Further, the aggregator helper 225 may receive a Helper Release Command message 912 from an aggregator 220 to release a path between the aggregator 220 and a source 210. Here, the aggregator helper 225 may enter the Released state 810, wherein the aggregator helper 225 does not act as a cooperative node for a path between a source 210 and an aggregator 220.

State and SDL Diagrams of a Source

Figure 10:
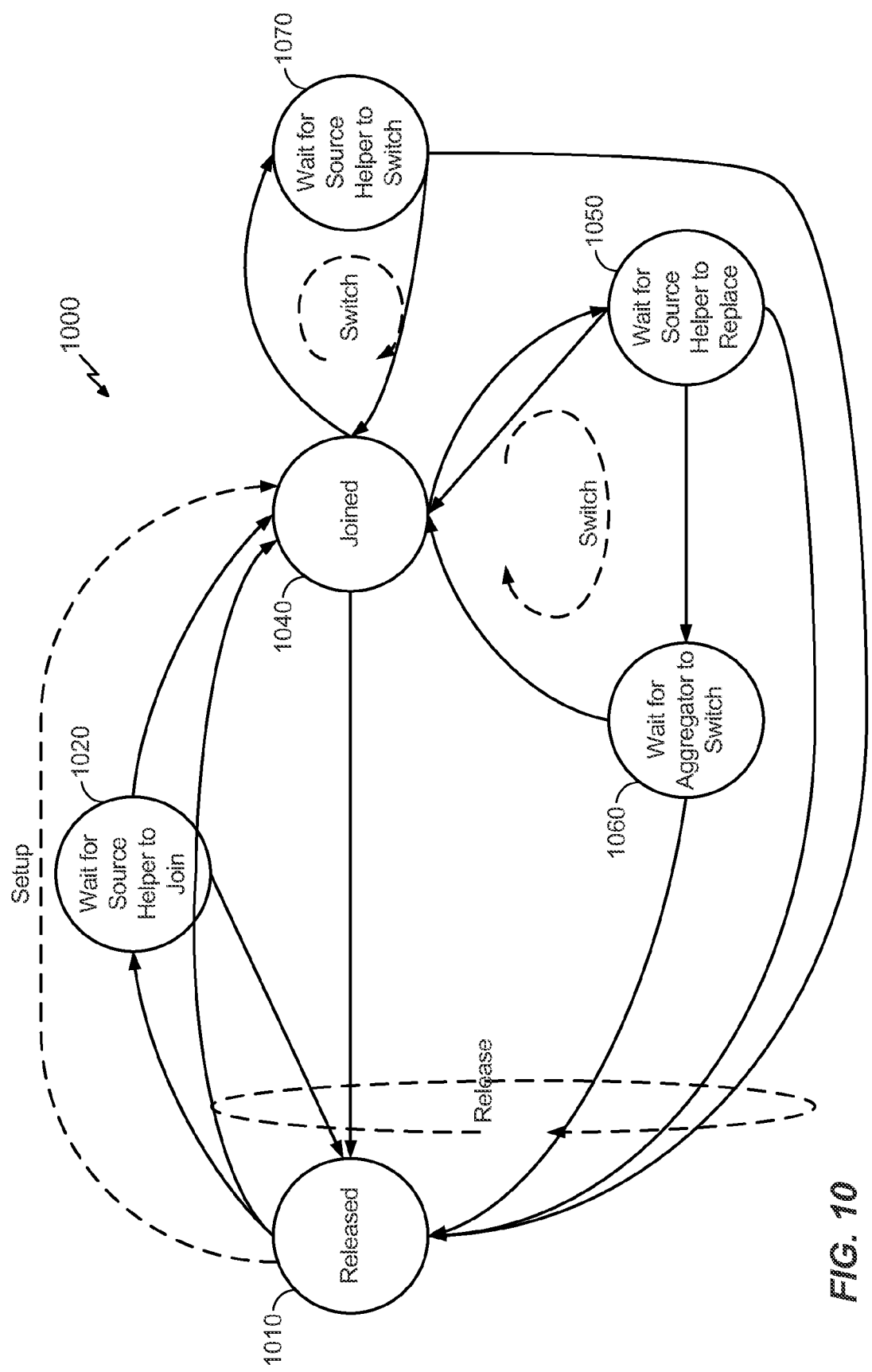
FIG. 10 illustrates a state transition diagram for a source.

Referring once again to the multipath overlay network 200 illustrated in FIG. 2, it is seen that a source 210 may be capable of sending information over multiple paths to a corresponding aggregator 220. In an aspect of the disclosure, as illustrated in FIG. 10, a source 210 may include a master state machine that governs the path management of the multiple paths established with the corresponding aggregator 220. In a further aspect of the disclosure, a master state machine for a source 210 can include multiple atomic state machines. Here, each atomic state machine governs the path management of a path between the source 210 and the corresponding aggregator 220.

A state transition diagram 1000 for a source 210 in accordance with some aspects of the disclosure is shown in FIG. 10. For each atomic state machine of the source 210, the source 210 has states including a Released state 1010; a Wait for Source Helper to Join state 1020; a Joined state 1040; a Wait for Source Helper to Replace state 1050; a Wait for Aggregator to Switch state 1060; and a Wait for Source Helper to Switch state 1070. At some of the states, as described below, the source 210 may utilize timers including an Original Helper Join timer, a Replacement Helper Join timer, and an Aggregator Join timer. Further, in some of the states, the source 210 may utilize a binary state variable "helper_active" for state reduction, with, e.g., a default value set to false. Signaling messages that are not designed to be handled as inputs at a certain state may be queued for a delayed processing.

Figure 11A:
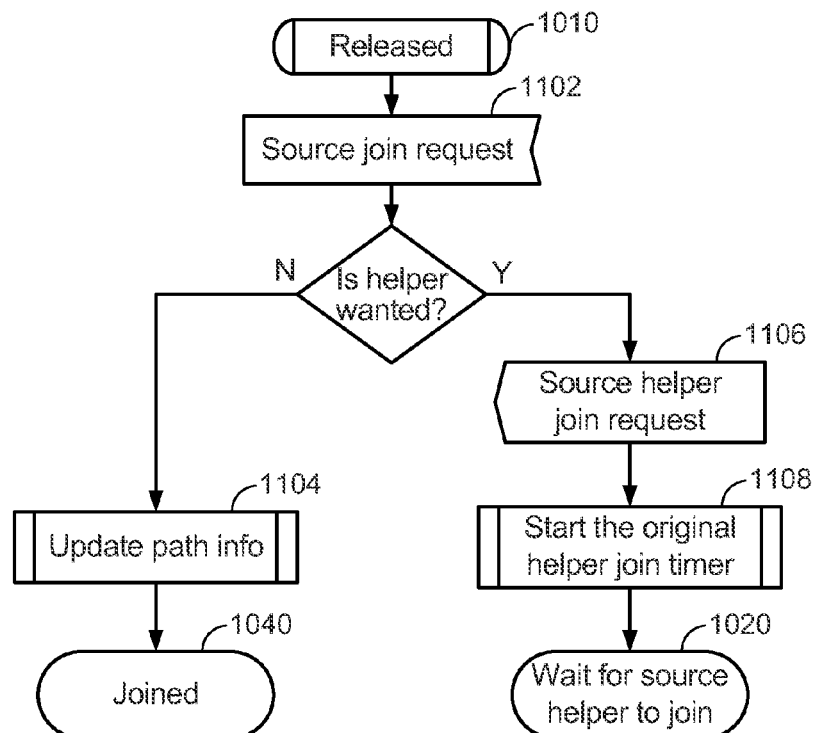
FIGS. 11A-11F illustrate an SDL diagram for a source.

FIGS. 11A-11F are SDF flow charts illustrating state transitions in the state transition diagram 1000 illustrated in FIG. 10. As illustrated in FIG. 11A, at the Released state 1010, the path between the source 210 and the node corresponding to this particular atomic state machine is released. Here, the source 210 may transition to the Joined state 1040 or the Wait for Source Helper to Join state 1020. The source 210 may receive a Source Join Request message 1102 from an aggregator 220 to request the source 210 to setup a path between the source 210 and the aggregator 220. If the source 210 is not in need of a helper, then the source 210 may update path information 1104 to establish a direct path from the source 210 to the aggregator 220, and may move to the Joined state 1040. If the source 210 desires a helper, the source 210 may send a Source Helper Join Request message 1106 to the corresponding source helper 215, and start an Original Helper Join timer 1108. The source 210 may then enter the Wait for Source Helper to Join state 1020.

Figure 11B:
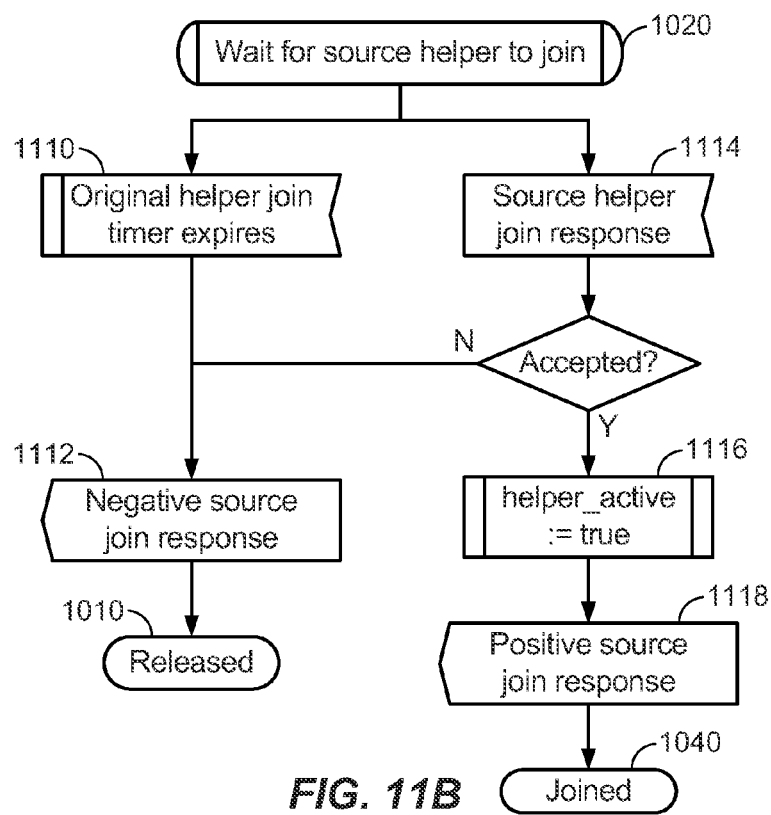

As illustrated in FIG. 11B, at the Wait for Source Helper to Join state 1020, the source 210 has sent a Source Helper Join Request message, and is awaiting, for the duration of the Original Helper Join timer, a Source Helper Join Response message. Here, if the Original Helper Join timer expires 1110, the source 210 may send a Negative Source Join Response message 1112 to the aggregator 220, and may enter the Released state 1010. However, prior to the expiration of the Original Helper Join timer, the source 210 may receive a Source Helper Join Response message 1114. If the message is not accepted, the source 210 may send a Negative Source Join Response message 1112 to the aggregator 220, and may enter the Released state 1010. If the message is accepted, the source 210 may then set the helper_active variable to true 1116, send a Positive Source Join Response message 1118, and enter the Joined state 1040.

Figure 11C:
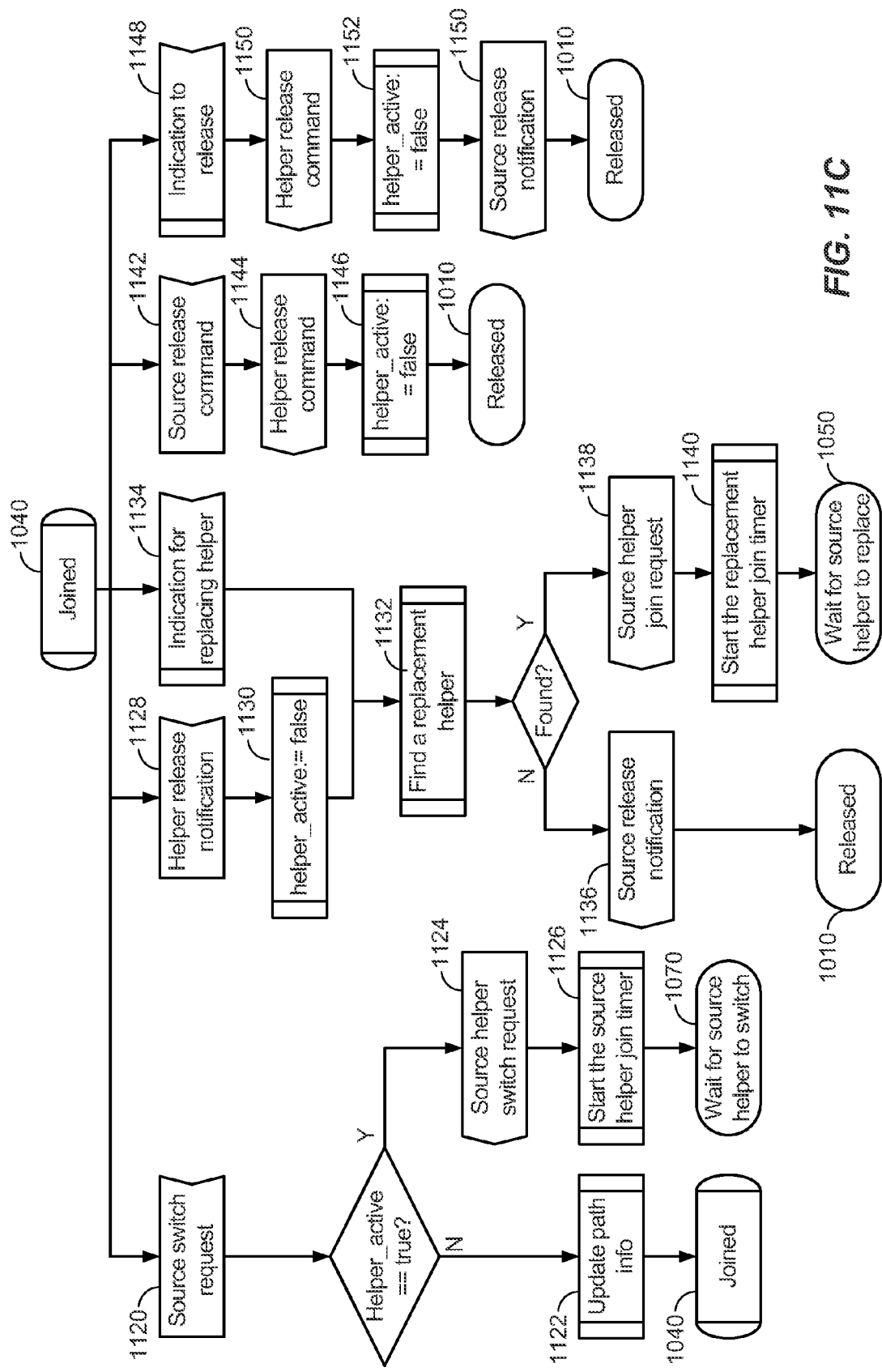

As illustrated in FIG. 11C, at the Joined state 1040, a path from the source 210 to a corresponding aggregator 220 exists, that path including the node corresponding to this particular atomic state machine. Here, the source 210 may receive a Source Switch Request message 1120 from the aggregator 220, to request the source 210 to switch a path between the source 210 and the aggregator 220. If the helper_active variable is false, then the source 210 may update path information 1122 to indicate the new path between the source 210 and the aggregator 220, and may enter the Joined state 1040. However, if the helper_active variable is true, then the source 210 may send a Source Helper Switch Request message 1124 to a source helper 215 to request the source helper 215 to switch a path between the source 210 and the aggregator 220, start the Source Helper Join timer 1126, and enter the Wait for Source Helper to Switch state 1070. Further, in the Joined state 1040, the source 210 may receive a Helper Release Notification message 1128 from a helper node, indicating to release a particular path utilizing that node, between the source 210 and the aggregator 220. Here, to release the path, the source 210 may set the helper_active variable to false 1130, and seek to find a replacement helper 1132. In the Joined state 1040, the source 210 may also receive an indication for replacing a joined helper 1134, in response to which the source 210 similarly may seek to find a replacement helper 1132. Here, if a replacement helper is not found, the source 210 may send a Source Release Notification message 1136 to the aggregator 220 to release the path between the source 210 and the aggregator 220, and enter the Released state 1010. If a replacement helper is found, the source 210 may send a Source Helper Join Request message 1138 to the found source helper 215, seeking to set up the path between the source 210 and the aggregator 220 utilizing the found source helper 215. The source 210 may then start the Replacement Helper Join timer 1140, and enter the Wait for Source Helper to Replace state 1050. Further, in the Joined state 1040, the source 210 may receive a Source Release Command message 1142 from the aggregator 220 indicating to release a path between the source 210 and the aggregator 220. Here, the source 210 may send a Helper Release Command message 1144 to a joined helper to release a path between the source 210 and the aggregator 220 utilizing the corresponding helper, and set the helper_active variable to false 1146, before entering the Released state 1010. Further, in the Joined state 1040, the source 210 may receive an Indication to Release message 1148, in response to which the source 210 may send a Helper Release Command message 1150 to the corresponding helper to release a path between the source 210 and the aggregator 220 utilizing that helper node. The source 210 may then set the helper_active variable to false 1152, send a Source Release Notification message 1154 to the aggregator 220, and enter the Released state 1010.

Figure 11D:
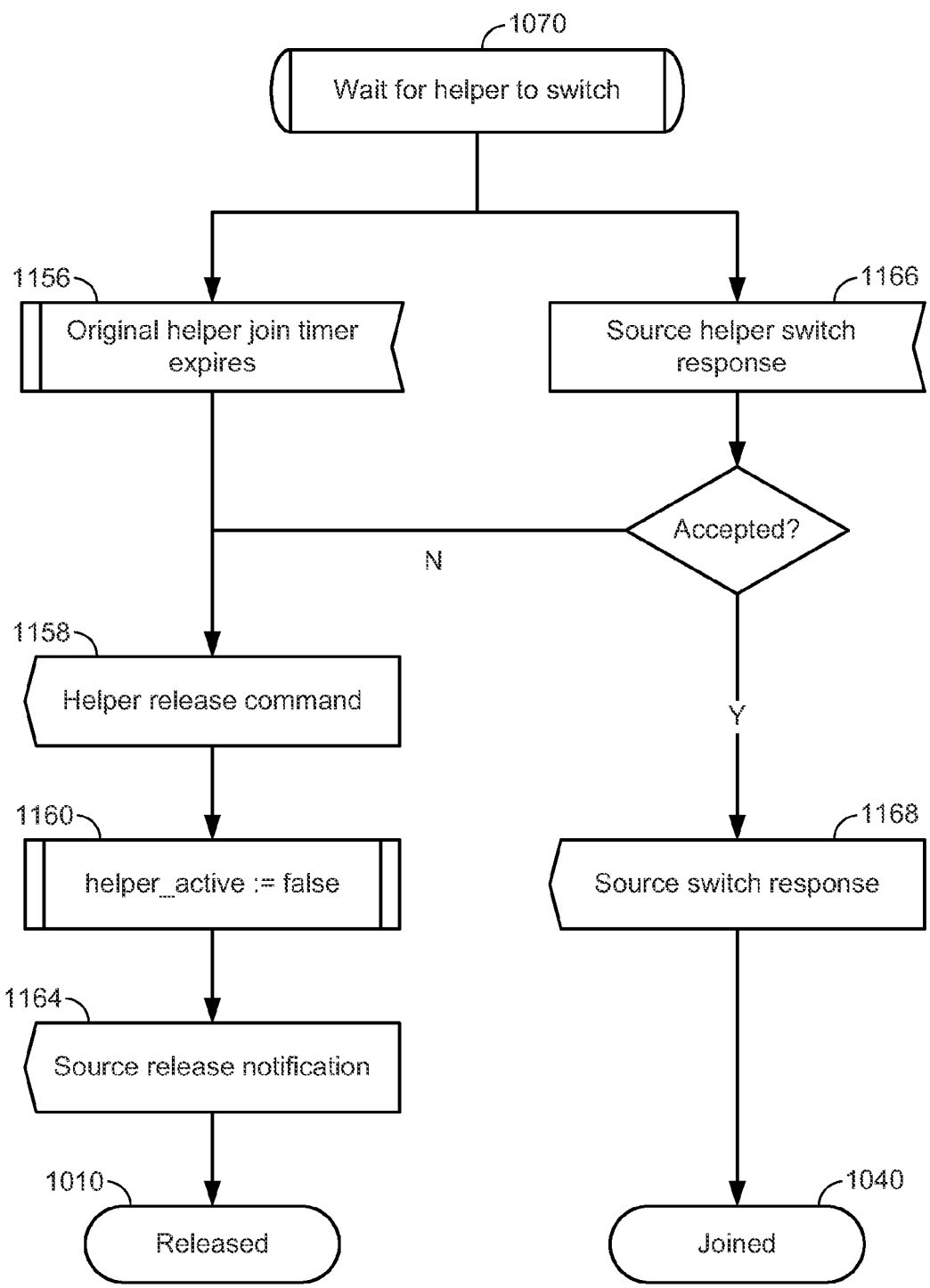

As illustrated in FIG. 11D, at the Wait for Helper to Switch state 1070, the source 210 has sent a Source Helper Switch Request message, and is awaiting, for the duration of the Original Helper Join timer, a Source Helper Switch Response message. Here, if the Original Helper Join timer expires 1156, the source 210 may send a Helper Release command 1158 to the respective helper, to release the corresponding path between the source 210 and the aggregator 220 utilizing that helper node. The source 210 may then set the helper_active variable to false 1160, and enter the Released state 1010. However, prior to the expiration of the Original Helper Join timer, the source 210 may receive a Source Helper Switch Response message 1166 from the source helper 215 in response to a Source Helper Switch Request message. If the source 210 does not accept the Source Helper Switch Response message, the source 210 may follow the process outlined just above to enter into the Released state 1010. If the source 210 accepts the Source Helper Switch Response message 766, then the source 210 may send a Source Switch Response message 1168 to the aggregator to respond to the Source Switch Request message, and may enter the Joined state 1040.

Figure 11E:
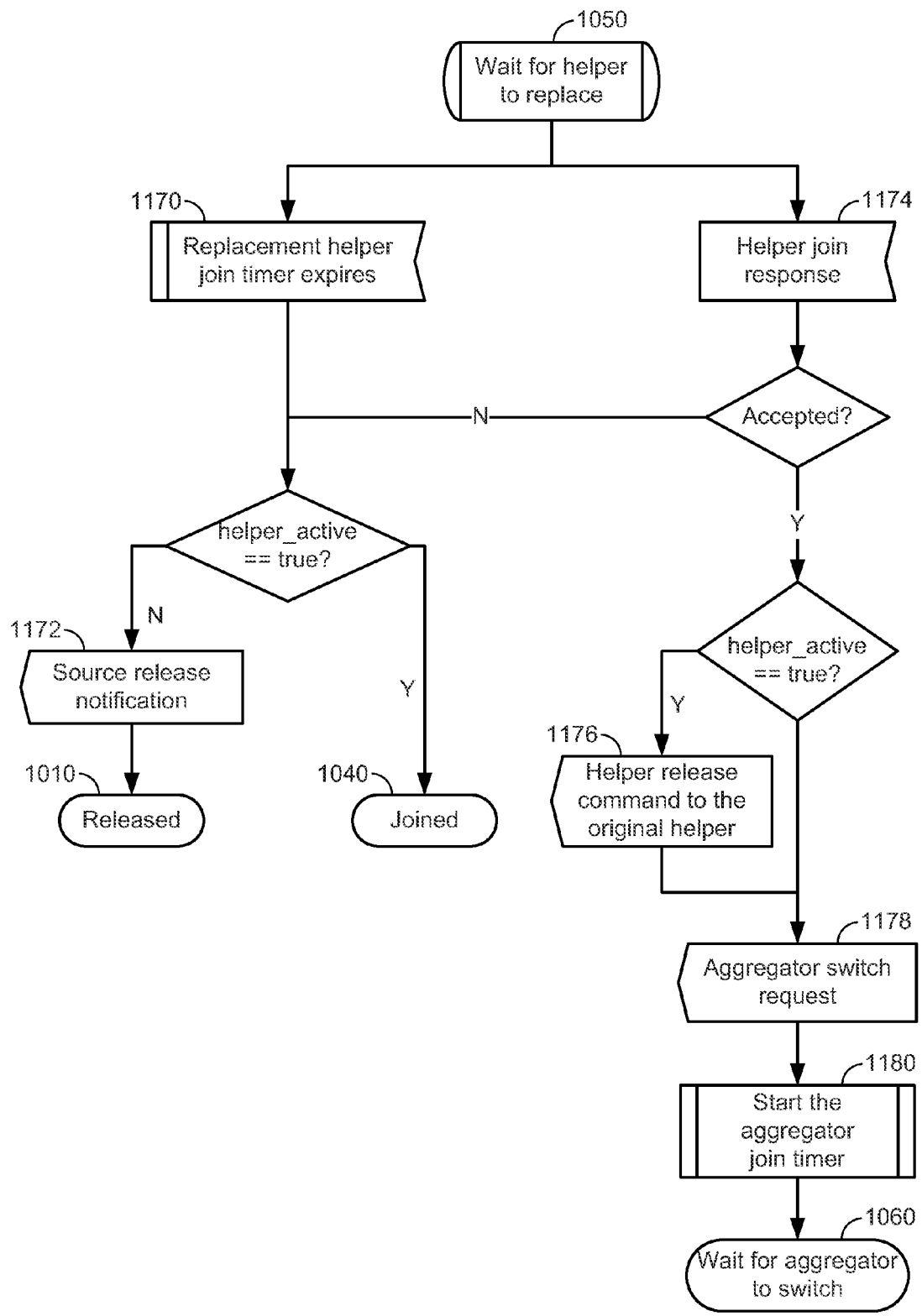

As illustrated in FIG. 11E, at the Wait for Source Helper to Replace state 1150, the source 210 has sent a Source Helper Join Request message to a found replacement source helper 215, and is awaiting, for the duration of the Replacement Helper Join timer, a Source Helper Join Response message from the found replacement source helper 215. Here, if the Replacement Helper Join timer expires 1170, but if the helper_active variable is false (indicating that the source 210 is not joined to a helper node), the source 210 sends a Source Release Notification message 1172 to the aggregator 220 to release the path between the source 210 and the aggregator 220, and enters the Released state 1010. However, if the Replacement Helper Join timer expires 1170, and the helper_active variable is true, then the source 210 enters the Joined state 1040, retaining the path between the source 210 and the aggregator 220 that includes the helper corresponding to this particular atomic state machine. Further, prior to the expiration of the Replacement Helper Join timer, the source 210 may receive a Source Helper Join Response message 1174 from a corresponding source helper 215 in response to a Source Helper Join Request message. If the source 210 does not accept the Source Helper Join Response message, then the source 210 follows the process outlined above to enter into either the Released state 1010 or the Joined state 1040. If the source 210 accepts the Source Helper Join Response message from the source helper 215, and if the helper_active variable is true, the source 210 may send a Helper Release Command message 1176 to the original helper to release the corresponding path between the source 210 and the aggregator 220 utilizing that helper node.

If the helper_active variable is false, the source 210 may skip the sending of the Helper Release Command message 1176. Next, the source 210 may send an Aggregator Switch Request message 1178 to the aggregator 220 to request the aggregator 220 to switch a path between the source 210 and the aggregator 220, start the Aggregator Join timer 1180, and enter the Wait for Aggregator to Switch state 1060.

Figure 11F:
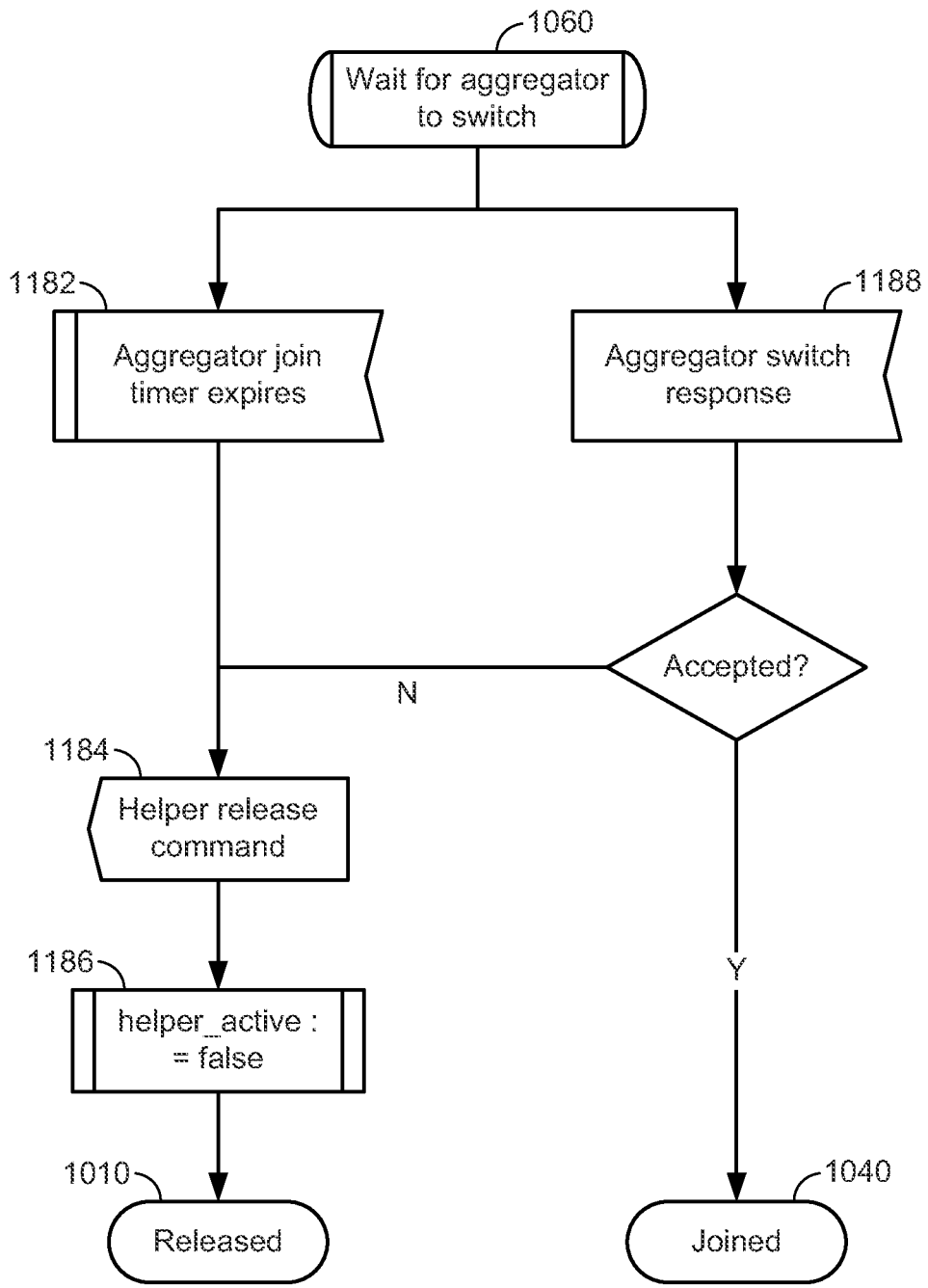

As illustrated in FIG. 11F, at the Wait for Aggregator to Switch state 1060, the source 210 has sent an Aggregator Switch Request message, and is awaiting, for the duration of the Aggregator Join timer, an Aggregator Switch Response message. Here, if the Aggregator Join timer expires 1182, the source 210 may send a Helper Release command 1184 to the respective helper, to release the corresponding path between the source 210 and the aggregator 220 utilizing that helper node. The source 210 may then set the helper_active variable to false 1186, and enter the Released state 1010. However, prior to the expiration of the Aggregator Join timer, the source 210 may receive an Aggregator Switch Response message 1188 from the aggregator 220 in response to the Aggregator Switch Request message. If the source 210 does not accept the Aggregator Switch Response message, the source 210 may follow the process outlined just above to enter into the Released state 1010. If the source 210 accepts the Aggregator Switch Response message 1188, then the source 210 enters the Joined state 1040.

State and SDL Diagrams of a Source Helper

Figure 12:
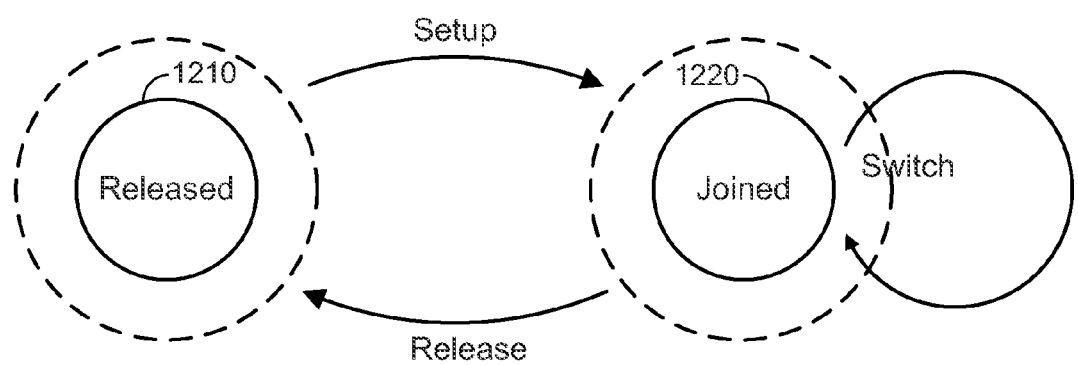
FIG. 12 illustrates a state transition diagram for a source helper.

FIG. 12 is an illustration of a state machine 1200 corresponding to a source helper 215, illustrated in FIG. 2. A source helper 215 may include a Released state 1210 and a Joined state 1220. That is, the source helper 215 may be joined to take part in forming a path, or may be released as a cooperative node.

Figure 13A:
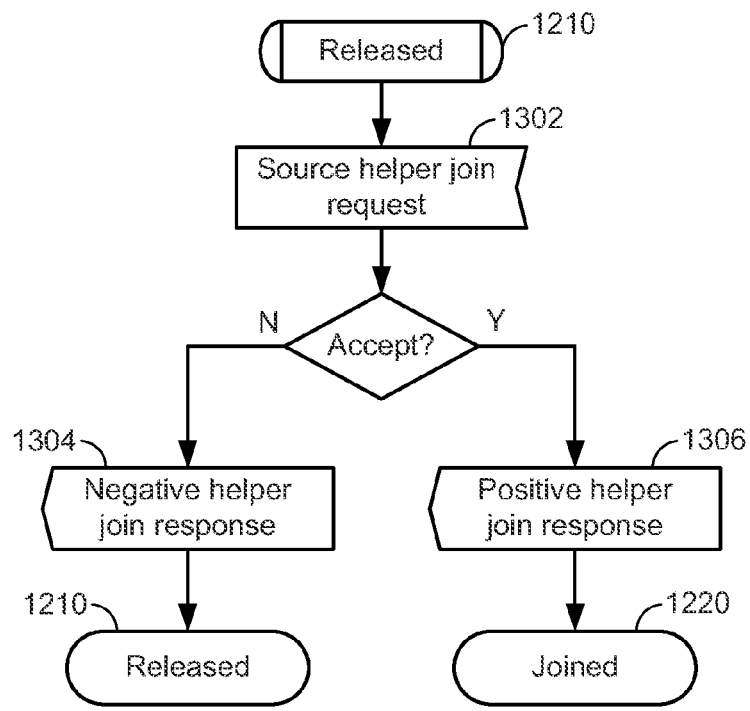
FIGS. 13A-13B illustrate an SDL diagram for a source helper.
Figure 13B:
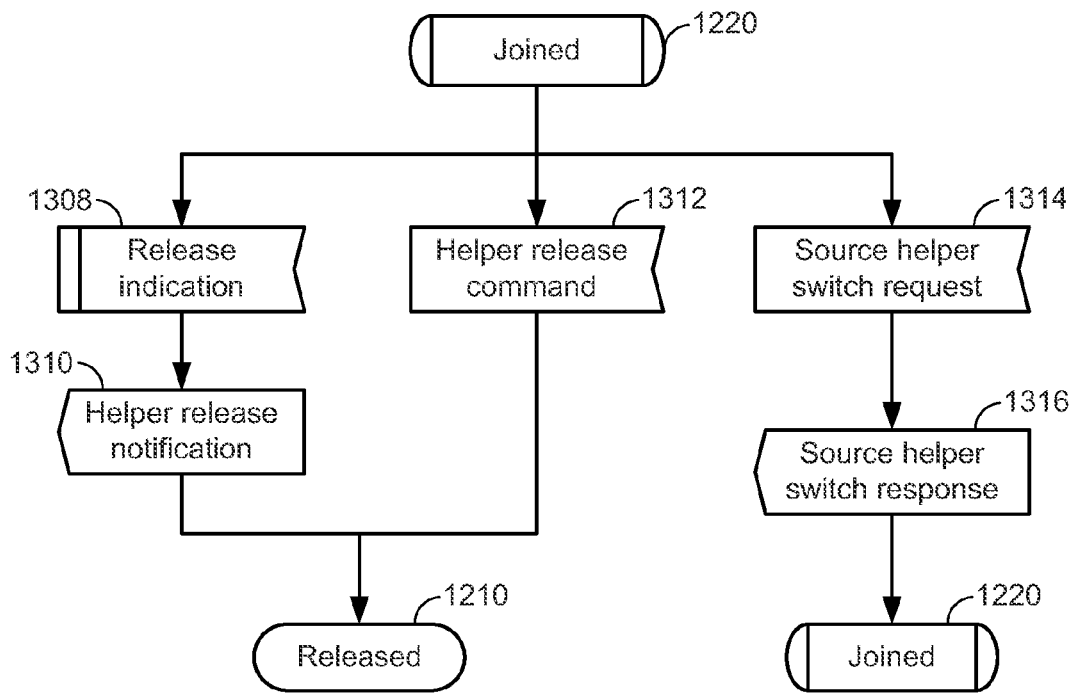

FIGS. 13A-13B are SDL flow charts illustrating state transitions in the state transition diagram 1200 illustrated in FIG. 12. As illustrated in FIG. 13A, at the Released state 1210, the source helper 215 does not act as a cooperative node for a path between a source 210 and an aggregator 220. Here, the source helper 215 may receive a Source Helper Join Request message 1302 from a source 210 to request the source helper 215 set up a path between the source 210 and an aggregator 220. If the source helper 215 does not accept the Source Helper Join Request message, the source helper 215 may send a Negative Source Helper Join Response message 1304 to the source 210, and return to the Released state 1210. If the source helper 215 accepts the Source Helper Join Request message, the source helper 215 may send a Positive Source Helper Join Response message 1306 to the source 210, and enter the Joined state 1220, in which the source helper 215 acts as a cooperative node in a path between the source 210 and an aggregator 220.

As illustrated in FIG. 13B, at the Joined state 1220, the source helper 215 acts as a cooperative node in a path between a source 210 and an aggregator 220. Here, the source helper 215 may receive a Release Indication 1308, and in response, the source helper 215 may send a Helper Release Notification message 1310 to the source 210 to release the path between the source 210 and an aggregator 220 utilizing the source helper 215. Further, the source helper 215 may receive a Helper Release Command message 1312 from a source 210 to release a path between the source 210 and an aggregator 220. Here, the source helper 215 may enter the Released state 1210, wherein the source helper 215 does not act as a cooperative node for a path between a source 210 and an aggregator 220. Still further, the source helper 215 may receive a Source Helper Switch Request message 1314 from the source 210 to request the source helper 215 to switch a path between the source 210 and an aggregator 220. Here, the source helper 215 may respond by sending a Source Helper Switch Response message 1316 and enter the Joined state 1220.

Multipath Overlay Network Packet Header

An example of a data packet header that may be utilized in multipath overlay network data packets are shown in FIG. 14. The message type field in the packet header of data packets may be set to "data," and the data payload of the data packets may start immediately after the packet header.

An example of a signaling packet header that may be utilized in multipath overlay network signaling messages is shown in FIG. 15. The payload of the corresponding signaling messages may start immediately after the packet header.

The meanings of the packet header fields for a particular implementation in accordance with some aspects of the disclosure are given in Table 2.

TABLE 2

Packet Header Fields

| Field | Description |
|---|---|
| Version | Version of the overlay network protocol |
| Ext | When set to 1, indicates that there is an extension header after the standard header |
| Message type | Overlay network message type |
| Packet length | Number of bytes in the payload |
| TTL | Time to live, or number of hops this message can live in the overlay network |
| Label ID | Label ID on a one hop link between two overlay network nodes |
| Payload type | Format of the payload; determines its interpretation by the application |

In the "message type" field of the packet header, an information element for characterizing the overlay network message type may be carried. The message types utilized in an exemplary implementation in accordance with some aspects of the present disclosure are listed in Table 3.

TABLE 3

Message Types

| Message Type Value | Message Type Name | Data or Signaling |
|---|---|---|
| 0 | Data | Data |
| 1 | Aggregator Helper Join Request | Signaling |
| 2 | Aggregator Helper Join Response | Signaling |
| 3 | Source Join Request | Signaling |
| 4 | Source Join Response | Signaling |
| 5 | Aggregator Switch Request | Signaling |
| 6 | Aggregator Switch Response | Signaling |
| 7 | Source Switch Request | Signaling |
| 8 | Source Switch Response | Signaling |
| 9 | Source Helper Join Request | Signaling |
| 10 | Source Helper Join Response | Signaling |
| 11 | Source Helper Switch Request | Signaling |
| 12 | Source Helper Switch Response | Signaling |
| 13 | Source Release Command | Signaling |
| 14 | Source Release Notification | Signaling |
| 15 | Helper Release Command | Signaling |
| 16 | Helper Release Notification | Signaling |
| 17-256 | Reserved | N/A |

Multipath Overlay Network Signaling Messages

Referring now to FIG. 2 and Table 3, in accordance with some aspects of the disclosure, an Aggregator Helper Join Request message may be sent from the aggregator 220 to corresponding aggregator helper 225, in order to request the aggregator helper 225 to set up a path between the source 210 and the aggregator 220. An Aggregator Helper Join Request message for a particular implementation in accordance with some aspects of the disclosure is listed in Table 4.

TABLE 4

Aggregator Helper Join Request Message

| Field | Description | Length |
|---|---|---|
| Aggregator address | Overlay network address of the aggregator: used by the receiver of the Join Request to identify the its sender | 32 bits |
| Aggregator helper address | Overlay network address of the aggregator helper: used by the receiver of the Join Request to check whether this message should be processed | 32 bits |
| Transaction ID | Unique ID of this transaction | 8 bits |
| Label ID | Used for the packet sent from the aggregator helper to the aggregator over this data path | 8 bits |
| Transport layer type | Transport layer type to be used for the data delivered over this path, such as TCP, UDP, etc. | 4 bits |
| Payload Type | Payload type of the data delivered over this path | 4 bits |
| Reserved | | 8 bits |

An Aggregator Helper Join Response message for a particular implementation in accordance with some aspects of the disclosure is listed in Table 5. Here, the Aggregator Helper Join Response message may be sent from the aggregator helper 225 to the aggregator 220, in order to respond to a corresponding Aggregator Helper Join Request message.

TABLE 5

Aggregator Helper Join Response Message

| Field | Description | Length |
|---|---|---|
| Aggregator helper address | Overlay network address of the aggregator helper: used by the receiver of the Join Response to identify its sender | 32 bits |
| Aggregator address | Overlay network address of the aggregator: used by the receiver of the Join Response to check whether this message should be processed | 32 bits |
| Transaction ID | May be equal to the transaction ID in the corresponding Aggregator Helper Join Request | 8 bits |
| Response code | 0x00 = accept; otherwise, reject with various reasons | 8 bits |
| Label ID | Identifies the label ID that should be used for the packet sent from the source or source helper to the aggregator helper over this data path | 8 bits |
| Reserved | | 8 bits |

A Source Join Request message for a particular implementation in accordance with some aspects of the disclosure is listed in Table 6. Here, the Source Join Request message may be sent from the aggregator 220 to the source 210 to request the source 210, in order to setup a path between the source 210 and the aggregator 220.

TABLE 6

Source Join Request Message

| Field | Description | Length |
|---|---|---|
| Aggregator address | Overlay network address of the aggregator: used by the receiver of the Join Request to identify its sender | 32 bits |
| Source address | Overlay network address of the source: used by the receiver of the Join Request to check whether this message should be processed | 32 bits |
| Transaction ID | Unique ID of this transaction | 8 bits |
| Session ID | Uniquely identifies the traffic session to be delivered over multiple paths between the source and the aggregator | 32 bits |
| Path index | Index of the path for this traffic session between the source and the aggregator | 4 bits |
| Aggregator or aggregator helper address | Overlay network address of the aggregator helper: may be used by either the source or the source helper | 32 bits |
| Label ID | Used for the packet sent from the source or source helper to the aggregator or aggregator helper over this data path | 8 bits |
| Transport layer type | Transport layer type to be used for the data delivered over this path, such as TCP, UDP, etc. | 4 bits |
| Payload Type | Payload type of the data delivered over this path | 4 bits |
| Reserved | | 4 bits |

A Source Join Response message for a particular implementation in accordance with some aspects of the disclosure is listed in Table 7. Here, the Source Join Response message may be sent from the source 210 to the aggregator 220, in order to respond to a Source Join Request message.

TABLE 7

Source Join Response Message

| Field | Description | Length |
|---|---|---|
| Source address | Overlay network address of the source: used by the receiver of the Join Response to identify its sender | 32 bits |
| Aggregator address | Overlay network address of the aggregator: used by the receiver of the Join Response to check whether this message should be processed | 32 bits |
| Transaction ID | May be equal to the transaction ID in the corresponding Source Join Request message | 8 bits |
| Response code | 0x00 = accept; otherwise, reject with various reasons | 8 bits |
| Source or source helper address | Overlay network address of the source or the source helper | 32 bits |

An Aggregator Switch Request message for a particular implementation in accordance with some aspects of the disclosure is listed in Table 8. Here, the Aggregator Switch Request message may be sent from the source 210 to the aggregator 220, in order to request the aggregator 220 to switch a path between the source 210 and the aggregator 220.

TABLE 8

Aggregator Switch Request Message

| Source address | Overlay network address of the source: used by the receiver of the Switch Request to identify its sender | 32 bits |
|---|---|---|

TABLE 8-continued

Aggregator Switch Request Message

| | | |
|---|---|---|
| Aggregator address | Overlay network address of the aggregator: used by the receiver of the Switch Request to check whether this message should be processed | 32 bits |
| Transaction ID | Unique ID of this transaction | 8 bits |
| Session ID | Uniquely identifies the traffic session to be delivered over multiple paths between the source and the aggregator | 32 bits |
| Path index | Index of the path for this traffic session between the source and the aggregator | 4 bits |
| Source or source helper address | Overlay network address of the source or the source helper | 32 bits |
| Label ID | Used for the packet sent from the source or source helper to the aggregator helper over this data path | 8 bits |
| Reserved | | 12 bits |

An Aggregator Switch Response message for a particular implementation in accordance with some aspects of the disclosure is listed in Table 9. Here, the Aggregator Switch Response message may be sent from the aggregator 220 to the source 210, in order to respond to an Aggregator Switch Request message.

TABLE 9

Aggregator Switch Response Message

| Field | Description | Length |
|---|---|---|
| Aggregator address | Overlay network address of the aggregator: used by the receiver of the Switch Request to identify its sender | 32 bits |
| Source address | Overlay network address of the source: used by the receiver of the Switch Request to check whether this message should be processed | 32 bits |
| Transaction ID | Equal to the transaction ID in the corresponding Aggregator Switch Request message | 8 bits |
| Response code | 0x00 = accept; otherwise, reject with various reasons | 8 bits |

A Source Switch Request message for a particular implementation in accordance with some aspects of the disclosure is listed in Table 10. Here, the Source Switch Request message may be sent from the aggregator 220 to the source 210, in order to request the source 210 to switch a path between the source 210 and the aggregator 220.

TABLE 10

Source Switch Request Message

| Field | Description | Length |
|---|---|---|
| Aggregator address | Overlay network address of the aggregator: used by the receiver of the Switch Request to identify its sender | 32 bits |
| Source address | Overlay network address of the source: used by the receiver of the Switch Request to check whether this message should be processed | 32 bits |
| Transaction ID | Unique ID of this transaction | 8 bits |
| Session ID | Uniquely identifies the traffic session to be delivered over multiple paths between the source and the aggregator | 32 bits |
| Path index | Index of the path for this traffic session between the source and the aggregator | 4 bits |

TABLE 10-continued

Source Switch Request Message

| Field | Description | Length |
|---|---|---|
| Aggregator or old aggregator helper address | Overlay network address of the aggregator or the old aggregator helper | 32 bits |
| Old Label ID | Old label ID used on the packet sent from the source or source helper to the aggregator or the aggregator helper over this data path | 8 bits |
| Aggregator or new aggregator helper address | Overlay network address of the aggregator or the new aggregator helper | 32 bits |
| New Label ID | New label ID to be used on the packet sent from the source or source helper to the aggregator or the aggregator helper over this data path | 8 bits |
| Reserved | | 4 bits |

A Source Switch Response message for a particular implementation in accordance with some aspects of the disclosure is listed in Table 11. Here, the Source Switch Response message may be sent from the source 210 to the aggregator 220, in order to respond to a Source Switch Request message.

TABLE 11

Source Switch Response Message

| Field | Description | Length |
|---|---|---|
| Source address | Overlay network address of the source: used by the receiver of the Switch Response to identify its sender | 32 bits |
| Aggregator address | Overlay network address of the aggregator: used by the receiver of the Switch Response to check whether this message should be processed | 32 bits |
| Transaction ID | Equal to the transaction ID in the corresponding Source Switch Request message | 8 bits |
| Response code | 0x00 = accept; otherwise, reject with various reasons | 8 bits |

A Source Helper Join Request message for a particular implementation in accordance with some aspects of the disclosure is listed in Table 12. Here, the Source Helper Join Request message may be sent from the source 210 to the source helper 215, in order to request the source helper 215 to set up a path between the source 210 and the aggregator 220.

TABLE 12

Source Helper Join Request Message

| Field | Description | Length |
|---|---|---|
| Source address | Overlay network address of the source: used by the receiver of the Join Request to identify its sender | 32 bits |
| Source helper address | Overlay network address of the source helper: used by the receiver of the Join Request to check whether this message should be processed | 32 bits |
| Transaction ID | Unique ID of this transaction | 8 bits |
| Aggregator or aggregator helper address | Overlay network address of the aggregator or aggregator helper: used by the source helper as the next hop overlay network address for this path | 32 bits |

TABLE 12-continued

Source Helper Join Request Message

| Field | Description | Length |
|---|---|---|
| Label ID | Used by the source helper for the packet sent from the source helper to the aggregator or the aggregator helper over this data path | 8 bits |
| Transport layer type | Transport layer type to be used for the data delivered over this path, such as TCP, UDP, etc. | 4 bits |
| Payload Type | Payload type of the data delivered over this path | 4 bits |
| Reserved | | 8 bits |

A Source Helper Join Response message for a particular implementation in accordance with some aspects of the disclosure is listed in Table 13. Here, the Source Helper Join Response message may be sent from the source helper 215 to the source 210, in order to respond to a Source Helper Join Request message.

TABLE 13

Source Helper Join Response Message

| Field | Description | Length |
|---|---|---|
| Source helper address | Overlay network address of the source helper: used by the receiver of the Join Response to identify its sender | 32 bits |
| Source address | Overlay network address of the source: used by the receiver of the Join Response to check whether this message should be processed | 32 bits |
| Transaction ID | Equal to the transaction ID in the corresponding Source Helper Join Request message | 8 bits |
| Response code | 0x00 = accept; otherwise, reject with various reasons | 8 bits |
| Label ID | Used for the packet sent from the source to the source helper over this data path | 8 bits |
| Reserved | | 8 bits |

A Source Helper Switch Request message for a particular implementation in accordance with some aspects of the disclosure is listed in Table 14. Here, the Source Helper Switch Request message may be sent from the source 210 to the source helper 215, in order to request a source helper 215 to switch a path between the source and the aggregator.

TABLE 14

Source Helper Switch Request Message

| Field | Description | Length |
|---|---|---|
| Source helper address | Overlay network address of the source helper: used by the receiver of the Switch Request to identify its sender | 32 bits |
| Source address | Overlay network address of the source: used by the receiver of the Switch Request to check whether this message should be processed | 32 bits |
| Transaction ID | Equal to the transaction ID in the corresponding Source Helper Switch Request message | 8 bits |
| Response code | 0x00 = accept; otherwise, reject with various reasons | 8 bits |

A Source Helper Switch Response message for a particular implementation in accordance with some aspects of the disclosure is listed in Table 15. Here, the Source Helper Switch Response message may be sent from the source helper 215 to the source 210, in order to respond to the Source Helper Switch Request message.

TABLE 15

Source Helper Switch Response Message

| Field | Description | Length |
|---|---|---|
| Source helper address | Overlay network address of the source helper: used by the receiver of the Switch Response to identify its sender | 32 bits |
| Source address | Overlay network address of the source: used by the receiver of the Switch Response to check whether this message should be processed | 32 bits |
| Transaction ID | Equal to the transaction ID in the corresponding Source Helper Switch Request message | 8 bits |
| Response code | 0x00 = accept; otherwise, reject with various reasons | 8 bits |

A Source Release Command message for a particular implementation in accordance with some aspects of the disclosure is listed in Table 16. Here, the Source Release Command message may be sent from the aggregator 220 to the source 210, in order to release a path between the source 210 and the aggregator 220.

TABLE 16

Source Release Command Message

| Field | Description | Length |
|---|---|---|
| Aggregator address | Overlay network address of the aggregator: used by the receiver of the Release Command to identify its sender | 32 bits |
| Source address | Overlay network address of the source: used by the receiver of the Release Command to check whether this message should be processed | 32 bits |
| Session ID | Uniquely identify the traffic session to be delivered over multiple paths between the source and the aggregator | 32 bits |
| Path index | Index of the path for this traffic session between the source and the aggregator | 4 bits |
| Aggregator or aggregator helper address | Overlay network address of the aggregator or the aggregator helper | 32 bits |
| Label ID | Label ID used for the packet sent from the source or source helper to the aggregator or the aggregator helper over this data path | 8 bits |
| Reserved | | 4 bits |

A Source Release Notification message for a particular implementation in accordance with some aspects of the disclosure is listed in Table 17. Here, the Source Release Notification message may be sent from the source 210 to the aggregator 220, in order to release a path between the source 210 and the aggregator 220.

TABLE 17

Source Release Notification Message

| Field | Description | Length |
|---|---|---|
| Source address | Overlay network address of the source: used by the receiver of the Release Notification to identify its sender | 32 bits |
| Aggregator address | Overlay network address of the aggregator: used by the receiver of the Release Notification to check whether this message should be processed | 32 bits |
| Session ID | Uniquely identify the traffic session to be delivered over multiple paths | 32 bits |

TABLE 17-continued

Source Release Notification Message

| Field | Description | Length |
| --- | --- | --- |
| Path index | Index of the path for this traffic session | 4 bits |
| Source or source helper address | Overlay network address of the source or the source helper | 32 bits |
| Label ID | Label ID used for the packet sent from the source or source helper to the aggregator or the aggregator helper over this data path | 8 bits |
| Reserved | | 8 bits |

A Helper Release Command message for a particular implementation in accordance with some aspects of the disclosure is listed in Table 18. Here, the Helper Release Command message may be sent from the aggregator 220 or the source 210 to its respective helper 225 or 215, in order to release a path between the aggregator 220 and the source 210.

TABLE 18

Helper Release Command Message

| Field | Description | Length |
| --- | --- | --- |
| Aggregator or source address | Overlay network address of the aggregator or source: used by the receiver of the Release Command to identify its sender | 32 bits |
| Aggregator helper or source helper address | Overlay network address of the aggregator helper or source helper: used by the receiver of the Release Command to check whether this message should be processed | 32 bits |
| Label ID | Label ID used for the packet sent from the source or source helper to the aggregator or the aggregator helper over this data path | 8 bits |
| Reserved | | 8 bits |

A Helper Release Notification message for a particular implementation in accordance with some aspects of the disclosure is listed in Table 19. Here, the Helper Release Notification message may be sent from a respective helper 225, 215 to its aggregator 220 or source 210, in order to release a path between the source 210 and the aggregator 220.

TABLE 19

Helper Release Notification Message

| Field | Description | Length |
| --- | --- | --- |
| Aggregator helper or source helper address | Overlay network address of the aggregator helper or source helper: used by the receiver of the Release Notification to identify its sender | 32 bits |
| Aggregator or source address | Overlay network address of the aggregator or source: used by the receiver of the Release Notification to check whether this message should be processed | 32 bits |
| Label ID | Label ID used for the packet sent from the source or source helper to the aggregator or the aggregator helper over this data path. | 8 bits |
| Reserved | | 8 bits |

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Nodes, such as aggregators, sources, their respective helpers, processors contained therein, computer program products, etc., may "support" data transport and communication, as disclosed in the specification, by providing or originating data, as provided, for example, by a source (in one or more substreams containing distinct descriptions of the data), relaying a description of the data in a substream, as provided, for example by a source helper and aggregator helper, and by receiving and aggregating one or more descriptions of the data in respective substreams, as provided, for example, by an aggregator.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A source apparatus, comprising:
    a memory; and
    at least one processor coupled to the memory and configured to:
    support a multimedia communication session for sending a plurality of distinct portions of data within a same communication session over separate respective paths of a plurality of paths from the source apparatus to an aggregator to reassemble the plurality of distinct portions of data, a first path of the plurality of paths comprising at least one helper node selected by the source apparatus or the aggregator, and
    receive a source join request from the aggregator to setup a second path between the source apparatus and the aggregator during the same multimedia communication session.

2. The source apparatus of claim 1, wherein the at least one processor is further configured to send a source helper join request to a source helper to setup the second path.

3. The source apparatus of claim 2, wherein the at least one processor is further configured to receive a source helper join response from the source helper indicating an availability of the source helper to setup the second path.

4. The source apparatus of claim 3, wherein the at least one processor is further configured to send, in response to the source join request, a source join response to the aggregator to indicate an establishment of the second path comprising the source helper.

5. The source apparatus of claim 2, wherein the at least one processor is further configured to establish the second path from the source apparatus to the aggregator, the second path comprising the source helper.

6. The source apparatus of claim 1, wherein the at least one processor is further configured to:
    receive a release request indicating to release the first path; and
    release the first path.

7. The source apparatus of claim 6, wherein the at least one helper node comprises a source helper, and wherein the release request comprises a helper release notification from the source helper indicating to release the first path between the source apparatus and the aggregator.

8. The source apparatus of claim 7, wherein the at least one processor is further configured to:
    seek a second source helper to replace the source helper; and
    send a source helper join request to the second source helper to request the second source helper to setup a second path between the source apparatus and the aggregator, the second path comprising the second source helper.

9. The source apparatus of claim 8, wherein the at least one processor is further configured to:
    receive a source helper join response from the second source helper indicating an availability of the second source helper to setup the second path.

10. The source apparatus of claim 9, wherein the at least one processor is further configured to send a source helper release command to the source helper to release the first path.

11. The source apparatus of claim 9, wherein the at least one processor is further configured to send an aggregator switch request to the aggregator to request the aggregator to switch to the second path between the source apparatus and the aggregator, the second path comprising the second source helper.

12. The source apparatus of claim 11, wherein the at least one processor is further configured to receive an aggregator switch response from the aggregator; and to establish the second path between the source apparatus and the aggregator, the second path comprising the second source helper.

13. The source apparatus of claim 6, wherein the at least one helper node comprises a source helper, and wherein the release request comprises an indication from the aggregator indicating to release the first path.

14. The source apparatus of claim 13, wherein the at least one processor is further configured to send a source helper release command to the source helper to release the first path.

15. The source apparatus of claim 14, wherein the at least one processor is further configured to send a source release notification to the aggregator to release the first path.

16. The source apparatus of claim 1, wherein the at least one helper comprises a source helper, and wherein the at least one processor is further configured to:
    receive a source switch request from the aggregator to request to switch the first path to a second path between the source apparatus and the aggregator;
    send a source helper switch request to the source helper to switch the first path to the second path;
    receive a source helper switch response from the source helper in response to the source helper switch request;
    send a source switch response to the aggregator in response to the source switch request; and
    establish the second path between the source apparatus and the aggregator, the second path comprising the source helper.

17. A method of communication from a source, the method comprising:
    supporting a multimedia communication session for sending a plurality of distinct portions of data within a same communication session over separate respective paths of a plurality of paths from the source to an aggregator to reassemble the plurality of distinct portions of the data, a first path of the plurality of paths comprising at least one helper node selected by the source or the aggregator; and
    receiving a source join request from the aggregator to setup a second path between the source and the aggregator during the same multimedia communication session.

18. The method of claim 17, further comprising:
sending a source helper join request to a source helper to setup the second path.

19. The method of claim 18, further comprising:
receiving a source helper join response from the source helper indicating an availability of the source helper to setup the second path.

20. The method of claim 19, further comprising:
sending, in response to the source join request, a source join response to the aggregator to indicate an establishment of the second path comprising the source helper.

21. The method of claim 18, further comprising:
establishing the second path from the source to the aggregator, the second path comprising the source helper.

22. The method of claim 17, further comprising:
receiving a release request indicating to release the first path; and
releasing the first path.

23. The method of claim 22, wherein the at least one helper node comprises a source helper, and wherein the release request comprises a helper release notification from the source helper indicating to release the first path between the source and the aggregator.

24. The method of claim 23, further comprising:
seeking a second source helper to replace the source helper; and
sending a source helper join request to the second source helper to request the second source helper to setup a second path between the source and the aggregator, the second path comprising the second source helper.

25. The method of claim 24, further comprising:
receiving a source helper join response from the second source helper indicating an availability of the second source helper to setup the second path.

26. The method of claim 25, further comprising:
sending a source helper release command to the source helper to release the first path.

27. The method of claim 25, further comprising:
sending an aggregator switch request to the aggregator to request the aggregator to switch to the second path between the source and the aggregator, the second path comprising the second source helper.

28. The method of claim 27, further comprising:
receiving an aggregator switch response from the aggregator; and to establish the second path between the source and the aggregator, the second path comprising the second source helper.

29. The method of claim 23, wherein the at least one helper node comprises a source helper, and wherein the release request comprises an indication from the aggregator indicating to release the first path.

30. The method of claim 29, further comprising:
sending a source helper release command to the source helper to release the first path.

31. The method of claim 30, further comprising:
sending a source release notification to the aggregator to release the first path.

32. The method of claim 17, wherein the at least one helper comprises a source helper, the method further comprising:
receiving a source switch request from the aggregator to request to switch the first path to a second path between the source and the aggregator;
send a source helper switch request to the source helper to switch the first path to the second path;
receive a source helper switch response from the source helper in response to the source helper switch request;
send a source switch response to the aggregator in response to the source switch request; and
establish the second path between the source and the aggregator, the second path comprising the source helper.

* * * * *